(12) United States Patent
Saigo et al.

(10) Patent No.: US 10,288,105 B2
(45) Date of Patent: May 14, 2019

(54) BOLT

(71) Applicant: SANNOHASHI CORPORATION, Yashio-shi, Saitama (JP)

(72) Inventors: Fumitaka Saigo, Saitama (JP); Hiroyuki Nakai, Smyrna, TN (US)

(73) Assignee: SANNOHASHI CORPORATION, Yashio-Shi, Saitama (JP)

( * ) Notice: Subject to any disclaimer, the term of this patent is extended or adjusted under 35 U.S.C. 154(b) by 0 days.

(21) Appl. No.: 15/897,579

(22) Filed: Feb. 15, 2018

(65) Prior Publication Data

US 2018/0172054 A1 Jun. 21, 2018

Related U.S. Application Data

(63) Continuation of application No. PCT/JP2015/073090, filed on Aug. 18, 2015.

(51) Int. Cl.
*F16B 31/00* (2006.01)
*F16B 31/02* (2006.01)
*F16B 23/00* (2006.01)

(52) U.S. Cl.
CPC ........ *F16B 31/021* (2013.01); *F16B 23/0007* (2013.01); *F16B 31/027* (2013.01); *F16B 23/003* (2013.01)

(58) Field of Classification Search
CPC .. F16B 31/021; F16B 23/0007; F16B 31/027; F16B 23/003
USPC .......................................................... 411/4
See application file for complete search history.

(56) References Cited

U.S. PATENT DOCUMENTS 3,865,007 A * 2/1975 Stanback ............ F16B 23/0007
411/2
4,408,936 A * 10/1983 Williamson ............ F16B 19/05
411/281
5,176,050 A * 1/1993 Sauer .................. B25B 23/1415
81/180.1

(Continued)

FOREIGN PATENT DOCUMENTS

JP          09329118 A      12/1997
JP          2000110816 A     4/2000

(Continued)

OTHER PUBLICATIONS

International Search Report corresponding to Application No. PCT/JP2015/073090; dated Sep. 29, 2015.

*Primary Examiner* — Gary W Estremsky
(74) *Attorney, Agent, or Firm* — Cantor Colburn LLP

(57) ABSTRACT

A bolt includes a head, and a shank connected to the head and having a screw portion and a leading end portion. The leading end portion of the shank includes a wall portion that defines a hole. The wall portion includes: a deformation portion configured to be plastically deformed by a torque from a fastening tool to be inserted in the hole; and a space forming portion configured to form a space between the space forming portion and the fastening tool. The blot is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range.

10 Claims, 16 Drawing Sheets

(56) References Cited

U.S. PATENT DOCUMENTS

| | | | | |
|---|---|---|---|---|
| 5,178,500 | A | * | 1/1993 | Stencel .................. F16B 39/34 29/456 |
| 5,452,974 | A | * | 9/1995 | Binns ..................... B25B 13/48 411/3 |
| 5,655,431 | A | * | 8/1997 | Pierce .................. B60T 17/083 411/361 |
| 5,743,690 | A | * | 4/1998 | Royle .................... B25B 13/54 411/178 |
| 6,199,455 | B1 | * | 3/2001 | Wagner .............. F16B 23/0007 81/121.1 |
| 6,247,883 | B1 | * | 6/2001 | Monserratt ........... F16B 13/045 411/34 |
| 2003/0133769 | A1 | | 7/2003 | Schultz |

FOREIGN PATENT DOCUMENTS

| | | | |
|---|---|---|---|
| JP | 2000240627 | A | 9/2000 |
| JP | 2005530105 | A | 10/2005 |
| JP | 2006046475 | A | 2/2006 |
| JP | 2014156898 | A | 8/2014 |

* cited by examiner

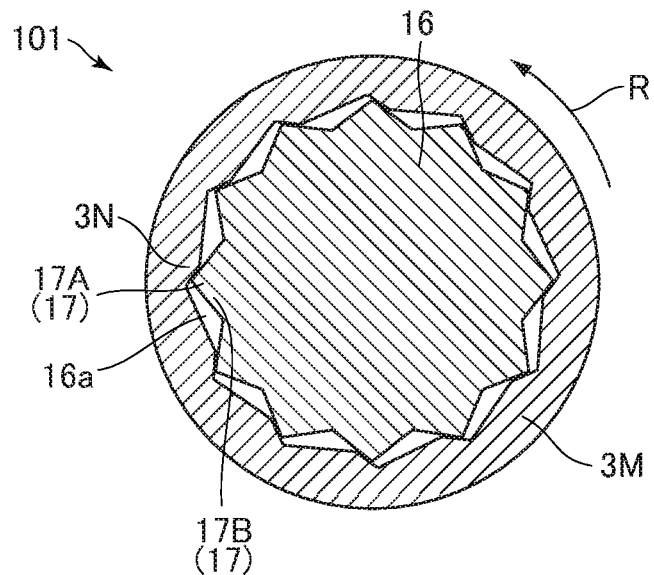
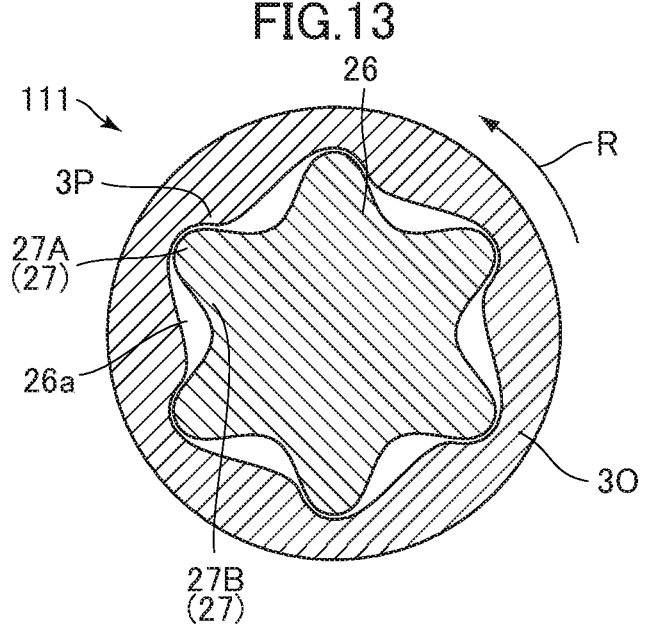

BOLT

CROSS REFERENCE TO RELATED APPLICATION

This application is a continuation application under 35 U.S.C. § 120 of PCT/JP2015/073090, filed Aug. 18, 2015, the entire content of the PCT application is incorporated herein by reference.

TECHNICAL FIELD

The present disclosure relates to a bolt that can be fastened from one side thereof.

BACKGROUND

A bolt that can be fastened from one side thereof has been proposed (for example, see Japanese Patent Application Publication No. 2000-110816).

In a bolt disclosed in Japanese Patent Application Publication No. 2000-110816, the bolt is fastened to a member to be fastened by a desired fastening torque by rotating a nut and a pintail provided on a leading end of a shank in directions opposite to each other by a wrench and by breaking the pintail.

SUMMARY

However, in the bolt in Japanese Patent Application Publication No. 2000-110816, the pintail is provided on the shank. As a result, the weight of the bolt increases and the cost increases. In addition, the pintail breaks when the bolt is fastened, and hence the pintail needs to be discarded and workability decreases when the bolt is fastened.

An object of the present disclosure is to provide a bolt of which weight and cost can be reduced.

A bolt in accordance with one or more embodiments includes a head, and a shank connected to the head and having a screw portion and a leading end portion. The leading end portion of the shank includes a wall portion that defines a hole. The wall portion includes: a deformation portion configured to be plastically deformed by a torque from a fastening tool to be inserted in the hole; and a space forming portion configured to form a space between the space forming portion and the fastening tool. The bolt is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range.

A bolt in accordance with one or more embodiments includes a head, a shank connected to the head and having a screw portion, and a pintail provided on a leading end side of the shank and having an outer peripheral portion. The outer peripheral portion includes: a deformation portion configured to be plastically deformed by a torque from a fastening tool; and a space forming portion configured to form a space between the space forming portion and the fastening tool. The bolt is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range.

A bolt in accordance with one or more embodiments includes a head, a shank connected to the head and having a screw portion, and a pintail provided on a leading end of the shank and having an outer peripheral surface. The outer peripheral surface is provided with a plurality of protrusion portions. The bolt is configured such that a maximum torque applied to the plurality of protrusion portions in a process, in which the plurality of protrusion portions receive a torque from a fastening tool and break from the outer peripheral surface and the fastening tool is placed in an idle rotation state, is configured to be set to be within a predetermined range.

BRIEF DESCRIPTION OF THE DRAWINGS

In the drawing:

FIG. 12 is a cross-sectional view of the bolt and an inner socket taken along the XII-XII line in FIG. 11;

FIG. 13 is a cross-sectional view of a bolt and an inner socket according to the modification example 3-1 corresponding to the cross-sectional view of the bolt and the inner socket taken along the XII-XII line in FIG. 11;

DETAILED DESCRIPTION

Figure 1:
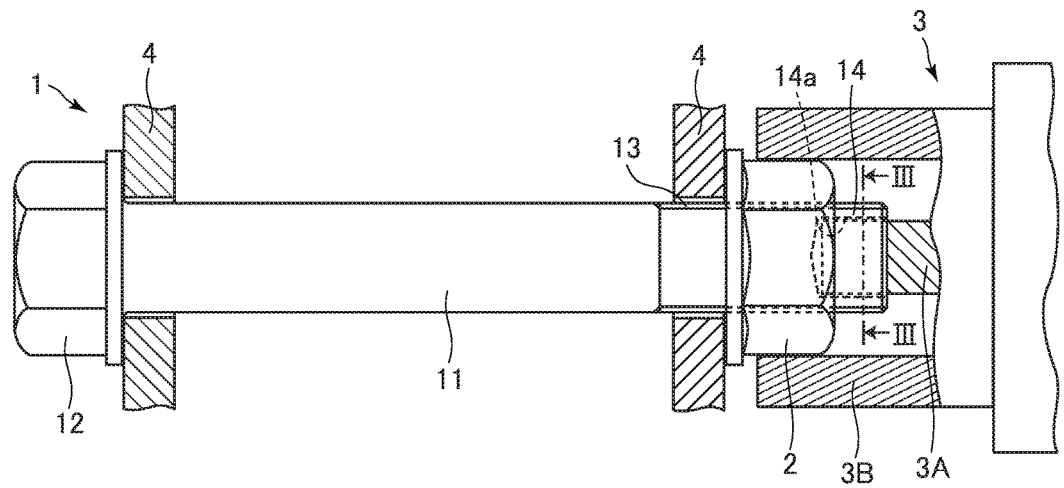
FIG. 1 is a view illustrating a state in which a bolt and a nut are tightened to a fastened member by a wrench according to a first embodiment.
Figure 2:
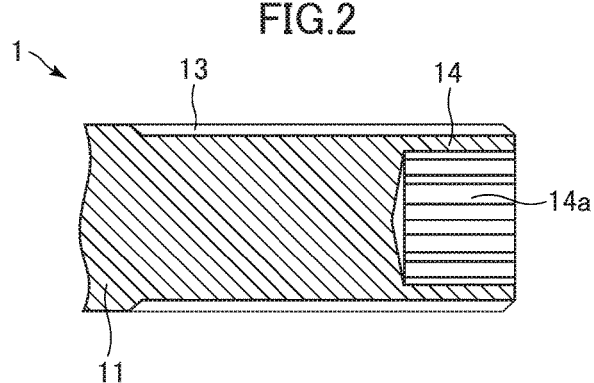
FIG. 2 is a cross-sectional view of a part near a leading end portion of the bolt taken along a plane including an axis of the shank.
Figure 3:
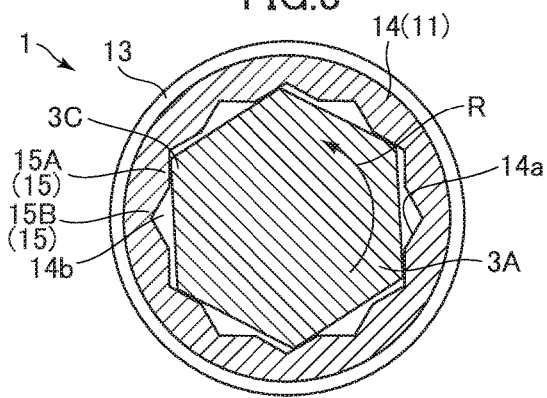
FIG. 3 is a cross-sectional view of the bolt and an inner plug taken along a line in FIG. 1.

A bolt according to some embodiments of the present disclosure is described with reference to the drawings. FIG. 1 is a view illustrating a state in which a bolt 1 and a nut 2 are tightened to a fastened member 4 by a wrench 3 in a first embodiment. FIG. 2 is a cross-sectional view of a part near a leading end portion 14 of the bolt 1 taken along a plane including an axis of the shank 11. FIG. 3 is a cross-sectional view of the bolt 1 and the inner plug 3A taken along a line in FIG. 1.

The bolt 1 is made of steel material and includes a cylindrical shank 11 and a head 12 provided on one end of the shank 11 as illustrated in FIG. 1. A male screw portion 13 is formed on an outer periphery of the other end side of the shank 11. A hole 14a is formed in the leading end portion 14 of the shank 11. The hole 14a is formed so that a cross-sectional shape thereof has a certain shape along a depth direction (an axial direction of the shank 11) as illustrated in FIG. 2.

As illustrated in FIG. 3, the hole 14a is formed as a dodecagonal hole and an inner plug 3A having a hexagonal cross section is inserted in the hole 14a when the bolt 1 is fastened. A wall portion 15 forming the hole 14a in the leading end portion 14 has a plurality of deformation portions 15A and a plurality of space forming portions 15B. When the bolt 1 is fastened, each deformation portion 15A receives a torque from a pressing portion 3C of the inner plug 3A and is plastically deformed. Each space forming portion 15B forms a space 14b between the space forming portion 15B and the inner plug 3A inserted in the hole 14a. The wall portion 15 includes 12 deformation portions 15A and 12 space forming portions 15B and the inner plug 3A includes six pressing portions 3C, but only one deformation portion 15A and one space forming portion 15B are denoted by reference numbers in FIG. 3 for simplification of illustration.

The wrench 3 includes the columnar inner plug 3A and a cylindrical outer socket 3B. The inner plug 3A and the outer socket 3B is made of a material having a hardness higher than the material of the bolt 1.

Next, a method of tightening the bolt 1 according to this embodiment to the fastened member 4 is described.

As illustrated in FIG. 1, in a state in which the bolt 1 is inserted in the fastened member 4 and the nut 2 is screwed with the male screw portion 13, the inner plug 3A is inserted in the hole 14a in the leading end portion 14 so that the outer socket 3B surrounds the outer periphery of the nut 2.

The inner plug 3A and the outer socket 3B are rotated in directions opposite to each other by a driving force from a driving source (not shown) of the wrench 3. The inner plug 3A is rotated in a rotation direction R as illustrated in FIG. 3. By this rotation, each pressing portion 3C of the hexagonal inner plug 3A comes into contact with the corresponding deformation portion 15A and transfers a torque to the leading end portion 14 of the shank 11. Then, the pressed deformation portion 15A is plastically deformed and displaced by the torque of the inner plug 3A, the plastically deformed part of each deformation portion 15A is accommodated in the space 14b, and the inner plug 3A rotates idly.

In the bolt 1, the maximum torque applied to the plurality of deformation portions 15A in the process in which a part of each deformation portion 15A is plastically deformed by the torque from the inner plug 3A and is accommodated in the corresponding space 14b and the inner plug 3A is placed in an idle rotation state is set within a predetermined range. The predetermined range corresponds to a desired fastening torque range. As a result, the bolt 1 can be tightened to the fastened member 4 by a desired fastening torque. The setting of the desired fastening torque for the bolt 1 can be set as appropriate by adjusting the material of the bolt 1, the depth of the hole 14a, the shape of the deformation portion 15A, and the like.

According to the bolt 1 of this embodiment, the wall portion 15 forming the hole 14a in the leading end portion 14 of the shank 11 has the plurality of deformation portions 15A and the plurality of space forming portions 15B that form the spaces 14b between the plurality of space forming portions 15B and the inner plug 3A. A part of each deformation portion 15A is plastically deformed by the torque from the inner plug 3A and that displacement is accommodated in the corresponding space 14b. From the abovementioned configuration, each deformation portion 15A can be stably deformed and the inner plug 3A can be idly rotated by applying a predetermined torque to each deformation portion 15A. As a result, the fastening torque can be stabilized when the bolt 1 is fastened.

The bolt 1 of this embodiment has a structure without a pintail, and hence the weight of the bolt 1 can be decreased and the cost can be reduced. In the bolt 1 of this embodiment, no waste is generated and workability can be enhanced.

Next, modification examples (modification examples 1-1 to 1-6) of the bolt 1 according to the first embodiment 1 are described. The same parts as those in the bolt 1 according to the first embodiment 1 are denoted by the same reference numbers and description thereof is omitted. Only the different parts are described.

Figure 4:
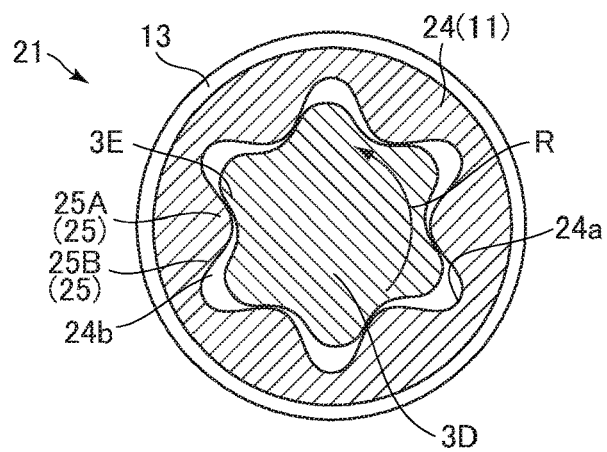
FIG. 4 is a cross-sectional view of a bolt and an inner plug according to the modification example 1-1 corresponding to the cross-sectional view of the bolt and the inner plug taken along the line in FIG. 1.

A bolt 21 according to the modification example 1-1 is described. FIG. 4 is a cross-sectional view of the bolt 21 and an inner plug 3D according to the modification example 1-1 corresponding to the cross-sectional view of the bolt 1 and the inner plug 3A taken along the line in FIG. 1.

A hole 24a having a hexalobular shape is formed in a leading end portion 24 of the shank 11 of the bolt 21. The inner plug 3D has a hexalobular shape in correspondence to the hole 24a.

A wall portion 25 forming the hole 24a in the leading end portion 24 has six deformation portions 25A and six space forming portions 25B. When the bolt 1 is fastened, each deformation portion 25A receives a torque from a pressing portion 3E of the inner plug 3D and is plastically deformed. Each space forming portion 25B forms a space 24b between the space forming portion 25B and the inner plug 3D inserted in the hole 24a. The wall portion 25 forming the hole 24a has six deformation portions 25A and six space forming portions 25B and the inner plug 3D has six pressing portions 3E, but only one deformation portion 25A, one space forming portion 25B, and one pressing portion 3E are denoted by reference numbers in FIG. 4 for simplification of illustration.

The inner plug 3D is rotated in the rotation direction R as illustrated in FIG. 4 by the driving force from the driving source (not shown) of the wrench 3 (FIG. 1) also in this modification example. By this rotation, each pressing portion 3E of the inner plug 3D comes into contact with the corresponding deformation portion 25A and transfers a torque to the leading end portion 24 of the shank 11. Then, the pressed deformation portion 25A is plastically deformed and displaced by the torque of the inner plug 3D, the plastically deformed part of each deformation portion 25A is accommodated in the space 24b, and the inner plug 3D rotates idly.

In the bolt 21, the maximum torque applied to the plurality of deformation portions 25A in the process in which a part of each deformation portion 25A is plastically deformed by the torque from the inner plug 3D and is accommodated in the corresponding space 24b and the inner plug 3D is placed in an idle rotation state is set to be within a predetermined range. As a result, the bolt 21 can be tightened to the fastened member by a desired fastening torque.

Each deformation portion 25A can be stably deformed and the inner plug 3D can be idly rotated by applying a predetermined torque to each deformation portion 25A also in the bolt 21 having the abovementioned configuration. As a result, the fastening torque can be stabilized when the bolt 21 is fastened. The bolt 21 of this modification example also achieves effects similar to those in the bolt 1 of the first embodiment.

Figure 5:
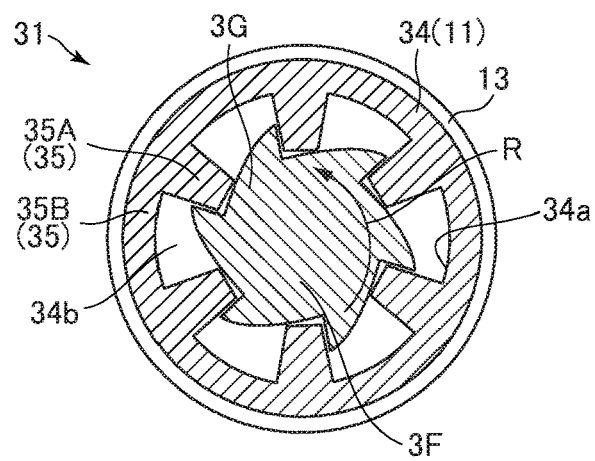
FIG. 5 is a cross-sectional view of a bolt and an inner plug according to the modification example 1-2 corresponding to the cross-sectional view of the bolt and the inner plug taken along the line in FIG. 1.

Next, a bolt 31 according to the modification example 1-2 is described. FIG. 5 is a cross-sectional view of the bolt 31 and an inner plug 3F according to the modification example 1-2 corresponding to the cross-sectional view of the bolt 1 and the inner plug 3A taken along the line in FIG. 1.

A hole 34a is formed in a leading end portion 34 of the shank 11 of the bolt 31. A wall portion 35 forming the hole 34a in the leading end portion 34 has six inwardly projecting deformation portions 35A and six space forming portions 35B. Each deformation portions 35A are provided on the wall portion 35 at regular intervals in the circumferential direction of the leading end portion 34. When the bolt 31 is fastened, each deformation portion 35A receives a torque from a pressing portion 3G of the inner plug 3F and is plastically deformed. Each space forming portion 35B forms a space 34b between the space forming portion 35B and the inner plug 3F inserted in the hole 34a. The inner plug 3F has six sawtooth-like pressing portions 3G. The wall portion 35 forming the hole 34a has six deformation portions 35A and six space forming portions 35B and the inner plug 3F has six pressing portions 3G, but only one deformation portion 35A, one space forming portion 35B, and one pressing portion 3G are denoted by reference numbers in FIG. 5 for simplification of illustration.

The inner plug 3F is rotated in the rotation direction R as illustrated in FIG. 5 by the driving force from the driving source (not shown) of the wrench 3 (FIG. 1) also in this modification example. By this rotation, each pressing portion 3G of the inner plug 3F comes into contact with the corresponding deformation portion 35A and transfers a torque to the leading end portion 34 of the shank 11. Then, the pressed deformation portion 35A is plastically deformed and displaced by the torque of the inner plug 3F, the plastically deformed part of each deformation portion 35A is accommodated in the space 34b, and the inner plug 3F rotates idly.

In the bolt 31, the maximum torque applied to the plurality of deformation portions 35A in the process in which a part of the deformation portion 35A is plastically deformed by the torque from the inner plug 3F and is accommodated in the space 34b and the inner plug 3F is placed in an idle rotation state is set to be within a predetermined range. As a result, the bolt 31 can be tightened to the fastened member 4 by a desired fastening torque.

Each deformation portion 35A can be stably deformed and the inner plug 3F can be idly rotated by applying a predetermined torque to each deformation portion 35A also in the bolt 31 having the abovementioned configuration. As a result, the fastening torque can be stabilized when the bolt 31 is fastened. The bolt 31 of this modification example also achieves effects similar to those in the bolt 1 of the embodiment.

Figure 6:
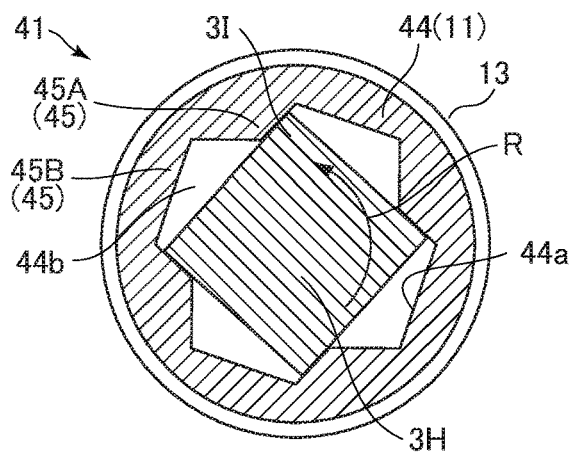
FIG. 6 is a cross-sectional view of a bolt and an inner plug according to the modification example 1-3 corresponding to the cross-sectional view of the bolt and the inner plug taken along the line in FIG.

Next, a bolt 41 according to the modification example 1-3 is described. FIG. 6 is a cross-sectional view of the bolt 41 and an inner plug 3H according to the modification example 1-3 corresponding to the cross-sectional view of the bolt 1 and the inner plug 3A taken along the line in FIG. 1.

A hole 44a is formed in a leading end portion 44 of the shank 11 of the bolt 41. The hole 44a has a cross-sectional shape that is a shape formed by connecting four peak-trough shaped portions formed of a pair of a peak portion and a trough portion. The inner plug 3H has a substantially equilateral quadrangle shape.

A wall portion 45 forming the hole 44a in the leading end portion 44 has a deformation portion 45A corresponding to the peak portion of the peak-trough shaped portion and a space forming portion 45B corresponding to the trough portion of the peak-trough shaped portion. When the bolt 41 is fastened, each deformation portion 45A receives a torque from a pressing portion 31 of the inner plug 3H and is plastically deformed. Each space forming portion 45B forms a space 44b between the space forming portion 45B and the inner plug 3H inserted in the hole 44a. The wall portion 45 forming the hole 44a has four deformation portions 45A and four space forming portions 45B and the inner plug 3H has four pressing portions 31, but only one deformation portion 45A, one space forming portion 45B, and one pressing portion 31 are denoted by reference numbers in FIG. 6 for simplification of illustration.

The inner plug 3H is rotated in the rotation direction R as illustrated in FIG. 6 by the driving force from the driving source (not shown) of the wrench 3 (FIG. 1) also in this modification example. By this rotation, the pressing portions 31 of the inner plug 3H comes into contact with all the deformation portions 45A and transfers a torque to the leading end portion 44 of the shank 11. Then, each deformation portion 45A is plastically deformed and displaced by the torque of the inner plug 3D, the plastically deformed part of each deformation portion 45A is accommodated in the space 44b, and the inner plug 3H rotates idly.

In the bolt 41, the maximum torque applied to the plurality of deformation portions 45A in the process in which a part of each deformation portion 45A is plastically deformed by the torque from the inner plug 3H and is accommodated in the corresponding space 44b and the inner plug 3D is placed in an idle rotation state is set to be within a predetermined range. As a result, the bolt 41 can be tightened to the fastened member 4 by a desired fastening torque.

Each deformation portion 45A can be stably deformed and the inner plug 3H can be idly rotated by applying a predetermined torque to each deformation portion 45A also in the bolt 41 having the abovementioned configuration. As a result, the fastening torque can be stabilized when the bolt 41 is fastened. The bolt 41 of this modification example also achieves effects similar to those in the bolt 1 of the first embodiment.

Figure 7A:
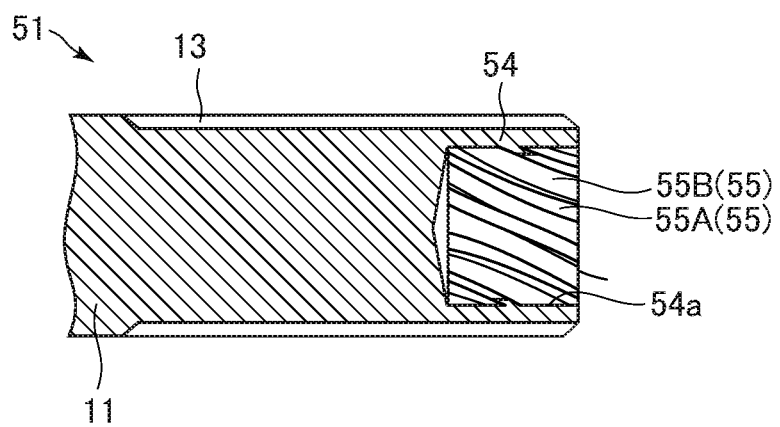
FIG. 7A is a cross-sectional view of a part near a leading end portion of a bolt according to the modification example 1-4 taken along a plane including the shaft of the shank.

Next, a bolt 51 according to the modification example 1-4 is described. FIG. 7A is a cross-sectional view of a part near a leading end portion 54 of the bolt 51 according to the modification example 1-4 taken along a plane including the shaft of the shank 11 and FIG. 7B is a cross-sectional view of the bolt 51 and an inner plug 3J according to the modification example 1-4 corresponding to the cross-sectional view of the bolt 1 and the inner plug 3A taken along the line in FIG. 1.

Figure 7B:
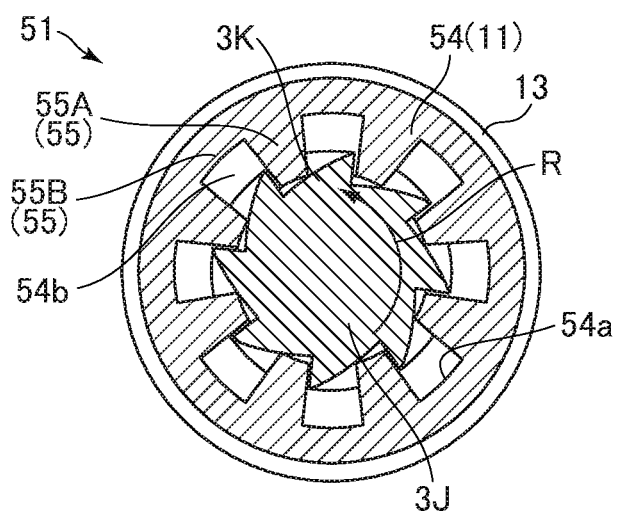
FIG. 7B is a cross-sectional view of the bolt and an inner plug according to the modification example 1-4 corresponding to the cross-sectional view of the bolt and the inner plug taken along the line in FIG. 1.

A hole 54a is formed in the leading end portion 54 of the shank 11 of the bolt 51 as illustrated in FIG. 7A and FIG. 7B. A wall portion 55 forming the hole 54a in the leading end portion 54 has eight inwardly projecting deformation portions 55A and eight space forming portions 55B. Each deformation portion 55A is provided on the wall portion 55 at regular intervals in the circumferential direction of the leading end portion 54. The deformation portions 55A are provided helically along the axial direction of the shank 11. That is, the axis of the deformation portion 55A forming a helical shape (helical axis) and the axis of the shank 11 are coaxially arranged. When the bolt 51 is fastened, each deformation portion 55A receives a torque from a pressing portion 3K of the inner plug 3J and is plastically deformed. Each space forming portion 55B forms a space 54b between the space forming portion 55B and the inner plug 3J inserted in the hole 54a.

The inner plug 3J has eight sawtooth-like pressing portions 3K. The pressing portions 3K are helically provided so as to correspond to the helical deformation portions 55A. The wall portion 55 forming the hole 54a has six deformation portions 55A and six space forming portions 55B and the inner plug 3J has six pressing portions 3K, but only one deformation portion 55A, one space forming portion 55B, and one pressing portion 3K are denoted by reference numbers in FIG. 7A and FIG. 7B for simplification of illustration.

The inner plug 3J is rotated in the rotation direction R as illustrated in FIG. 7B by the driving force from the driving source (not shown) of the wrench 3 (FIG. 1) also in this modification example. By this rotation, each pressing portion 3K of the inner plug 3J comes into contact with the corresponding deformation portion 55A and transfers a torque to the leading end portion 54 of the shank 11. Then, each deformation portion 55A is plastically deformed and displaced by the torque of the inner plug 3J, the plastically deformed part of each deformation portion 55A is accommodated in the space 54b, and the inner plug 3J rotates idly.

In the bolt 51, the maximum torque applied to the plurality of deformation portions 55A in the process in which a part of each deformation portion 55A is plastically deformed by the torque from the inner plug 3J and is accommodated in the space 54b and the inner plug 3J is placed in an idle rotation state is set to be within a predetermined range. As a result, the bolt 51 can be tightened to the fastened member 4 by a desired fastening torque.

The deformation portion 55A forms a helical shape and the pressing portion 3K of the inner plug 3J also forms a helical shape, and hence the inner plug 3J can be prevented from falling out of the hole 54a when the bolt 51 is fastened. As a result, the depth of the hole 54a can become shallower, and hence the length of bolt 51 can become shorter and the weight and the cost of the bolt 51 can be reduced. The fastening torque can be changed by changing the angle of the deformation portion 55A forming a helical shape.

Each deformation portion 55A can be stably deformed and the inner plug 3J can be idly rotated by applying a predetermined torque to each deformation portion 55A also in the bolt 51 having the abovementioned configuration. As a result, the fastening torque can be stabilized when the bolt 51 is fastened. The bolt 51 of this modification example also achieves effects similar to those in the bolt 1 of the first embodiment.

Figure 8:
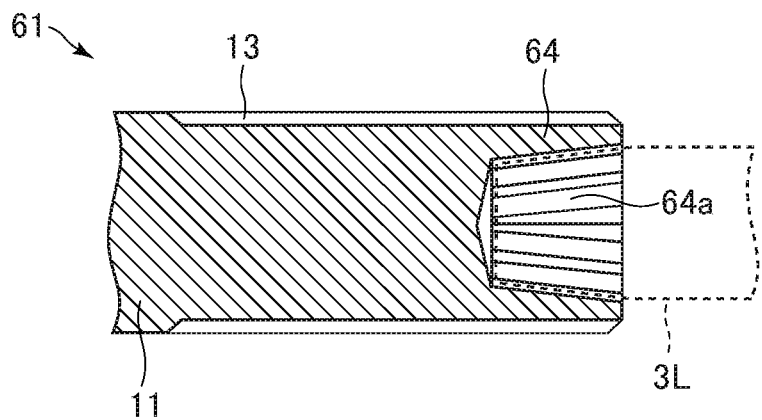
FIG. 8 is a cross-sectional view of a part near a leading end portion of a bolt 61 according to the modification example 1-5 taken along a plane including the axis of the shank.

Next, a bolt 61 according to the modification example 1-5 is described. FIG. 8 is a cross-sectional view of a part near a leading end portion 64 of the bolt 61 according to the modification example 1-5 taken along a plane including the axis of the shank 11.

A hole 64a is formed in the leading end portion 64 of the shank 11 of the bolt 61 as illustrated in FIG. 8. The hole 64a is tapered in the depth direction. A wall portion forming the hole 64a in the leading end portion 64 has the deformation portions and the space forming portions in any of the first embodiment and the modification examples 1-1 to 1-4. The leading end portion of an inner plug 3L is tapered in correspondence to the shape of the hole 64a.

According to the bolt 61 of this modification example, it is possible to easily pull out the inner plug 3L from the hole 64a after the bolt 61 fastened. The bolt 61 of this modification example achieves effects similar to those in the bolts in the first embodiment 1 and the modification examples 1-1 to 1-4.

Figure 9:
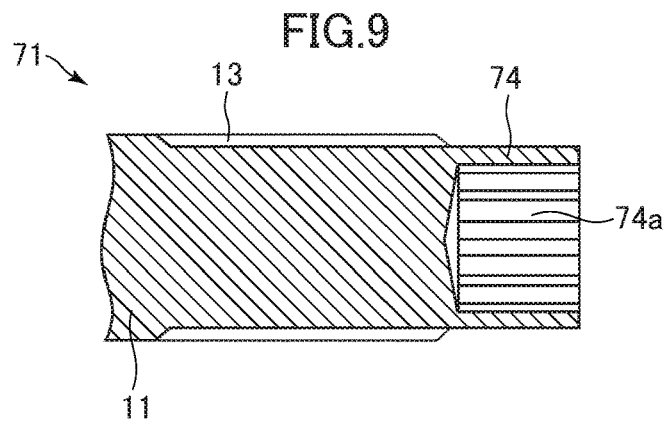
FIG. 9 is a cross-sectional view of a part near a leading end portion of a bolt according to the modification example 1-6 taken along a plane including the axis of the shank.

Next, a bolt 71 according to the modification example 1-6 is described. FIG. 9 is a cross-sectional view of a part near a leading end portion 74 of the bolt 71 according to the modification example 1-6 taken along a plane including the axis of the shank 11.

As illustrated in FIG. 9, the leading end portion 74 is provided in an end portion of the male screw portion 13 and the length of the leading end portion 74 in the direction orthogonal to the axis of the shank 11 is shorter than the diameter of the male screw portion 13. A wall portion forming a hole 74a in the leading end portion 74 has the deformation portions and the space forming portions in any of the first embodiment and the modification examples 1-1 to 1-4.

According to the bolt 71 of this modification example, the male screw portion 13 is short and hence the nut 2 can be easily fastened. The bolt 71 of this modification example achieves effects similar to those in the bolts in the first embodiment and the modification examples 1-1 to 1-4. The hole 74a in the leading end portion 74 may have a linear shape (substantially cylindrical shape) along the axis of the shank 11 or may be tapered.

Next, a bolt 81 of a second embodiment of the present disclosure is described with reference to FIG. 10.

Figure 10:
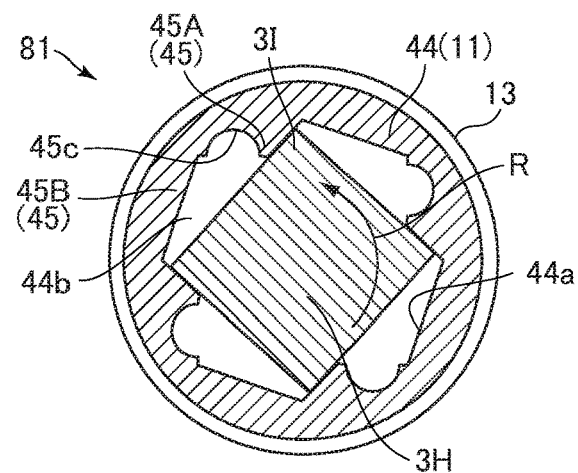
FIG. 10 is a cross-sectional view of a bolt and an inner plug of the second embodiment corresponding to the cross-sectional view of the bolt and the inner plug taken along the line in FIG. 1.

FIG. 10 is a cross-sectional view of the bolt 81 and an inner plug 3H of the second embodiment corresponding to the cross-sectional view of the bolt 1 and the inner plug 3A taken along the line in FIG. 1. The same parts as those in the bolt 41 according to the modification example 1-3 of the first embodiment 1 are denoted by the same reference numbers and description thereof is omitted. Only the different parts are described.

In the wall portion 45, a recessed portion 45c is formed on the downstream side of each deformation portion 45A in the rotation direction R of the inner plug 3H.

In this embodiment, the inner plug 3H is rotated in the rotation direction R as illustrated in FIG. 10 by rotating the inner plug 3H and the outer socket 3B (FIG. 1) in directions opposite to each other by the driving force from the driving source (not shown) of the wrench 3 (FIG. 1). By this rotation, each pressing portion 31 of the inner plug 3H comes into contact with the corresponding deformation portion 45A and transfers a torque to the leading end portion 44 of the shank 11. Then, each deformation portion 45A is plastically deformed and displaced by the torque of the inner plug 3H, the plastically deformed part of each deformation portion 45A is accommodated in the recessed portion 45c, and the inner plug 3H rotates idly.

In the bolt 81, the maximum torque applied to the plurality of deformation portions 45A in the process in which a part of each deformation portion 45A is plastically deformed by the torque from the inner plug 3H and is accommodated in the corresponding recessed portion 45c and the inner plug 3H is placed in an idle rotation state is set to be within a predetermined range. As a result, the bolt 81 can be tightened to the fastened member 4 by a desired fastening torque.

Each deformation portion 45A can be stably deformed and the inner plug 3H can be idly rotated by applying a predetermined torque to each deformation portion 45A also in the bolt 81 having the abovementioned configuration. As a result, the fastening torque can be stabilized when the bolt 81 is fastened. The bolt 81 of this modification example achieves effects similar to those in the bolt 1 of the first embodiment. The hole 44a in the leading end portion 44 may have a linear shape (substantially cylindrical shape) along the axis of the shank 11 or may be tapered. The leading end portion 44 may be provided in an end portion of the male screw portion 13 and the length of the leading end portion 44 in the direction orthogonal to the axis of the shank 11 may be shorter than the diameter of the male screw portion 13.

Next, a bolt 101 of a third embodiment of the present disclosure is described with reference to FIG. 11 and FIG. 12. The same parts as the bolt 1, the nut 2, and the wrench 3 described in the first embodiment are denoted by the same reference numbers and description thereof is omitted. Only the different parts are described.

Figure 11:
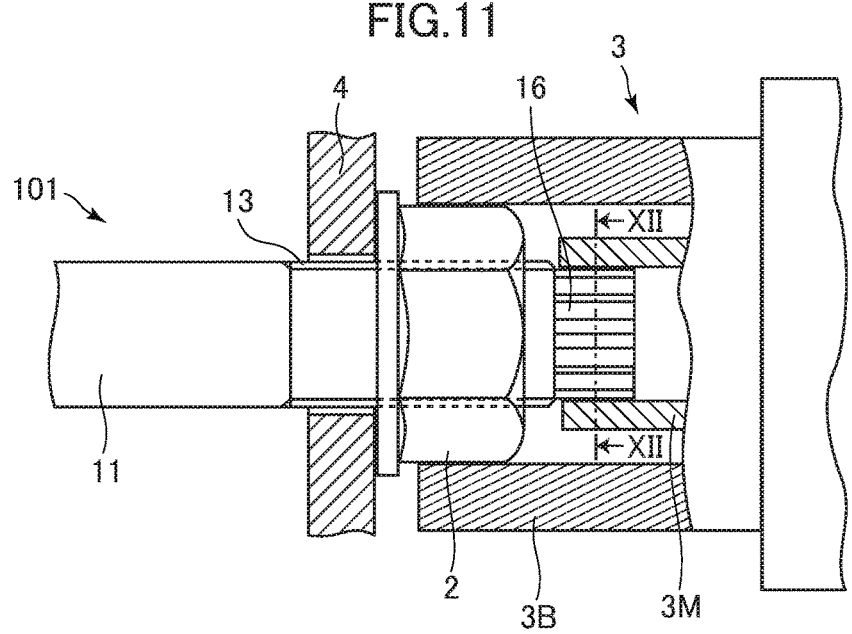
FIG. 11 is a view illustrating a state in which a bolt and the nut are tightened to the fastened member by the wrench in the third embodiment.

FIG. 11 is a view illustrating a state in which the bolt 101 and the nut 2 are tightened to the fastened member 4 by the wrench 3 in the third embodiment. FIG. 12 is a cross-sectional view of the bolt 101 and an inner socket 3M taken along the XII-XII line in FIG. 11.

In the bolt 101, a pintail 16 is provided on a leading end side of the shank 11. The pintail 16 has a dodecagonal shape. When the bolt 101 is fastened, the pintail 16 is inserted in the cylindrical inner socket 3M. An outer peripheral portion 17 of the pintail 16 has 12 deformation portions 17A and 12 space forming portions 17B. When the bolt 101 is fastened, each deformation portion 17A receives a torque from a pressing portion 3N of the inner socket 3M and is plastically deformed. Each space forming portion 17B forms a space 16a between the space forming portion 17B and the inner socket 3M. The pintail 16 has 12 deformation portions 17A and 12 space forming portions 17B and the inner socket 3M has 12 pressing portions 3N, but only one deformation portion 17A, one space forming portion 17B, and one pressing portion 3N are denoted by reference numbers in FIG. 12 for simplification of illustration.

Next, a method of tightening the bolt 101 according to this embodiment to the fastened member 4 is described.

As illustrated in FIG. 11, in a state in which the bolt 101 is inserted in the fastened member 4 and the nut 2 is screwed with the male screw portion 13, the inner socket 3M is inserted in the pintail 16 and the nut 2 is inserted in the outer socket 3B.

The inner socket 3M and the outer socket 3B are rotated in directions opposite to each other by the driving force from the driving source (not shown) of the wrench 3. The inner socket 3M is rotated in the rotation direction R as illustrated in FIG. 12. By this rotation, each pressing portion 3N of the inner socket 3M comes into contact with the corresponding deformation portion 17A and transfers a torque to the pintail 16. Then, each deformation portion 17A is plastically deformed and displaced by the torque of the inner socket 3M, the plastically deformed part of each deformation portion 17A is accommodated in the space 16a, and the inner socket 3M rotates idly.

In the bolt 101, the maximum torque applied to the plurality of deformation portions 17A in the process in which a part of each deformation portion 17A is plastically deformed by the torque from the inner socket 3M and is accommodated in the corresponding space 16a and the inner socket 3M is placed in an idle rotation state is set to be within a predetermined range. The predetermined range corresponds to a desired fastening torque range. As a result, the bolt 101 can be tightened to the fastened member 4 by a desired fastening torque. In the bolt 101, the setting of the desired fastening torque can be set as appropriate by adjusting the material of the bolt 101, the length of the pintail 16, the shape of the deformation portion 17A, and the like.

According to the bolt 101 of this embodiment, the outer peripheral portion 17 of the pintail 16 has the plurality of deformation portions 17A and the plurality of space forming portions 17B that form the spaces 16a between the plurality of space forming portions 17B and the inner socket 3M. A part of each deformation portion 17A is plastically deformed by the torque from the inner socket 3M and that displacement is accommodated in the corresponding space 16a. From the abovementioned configuration, each deformation portion 17A can be stably deformed and the inner socket 3M can be idly rotated by applying a predetermined torque to each deformation portion 17A. As a result, the fastening torque can be stabilized when the bolt 101 is fastened.

The bolt 101 of this embodiment has a structure in which the pintail 16 does not fall out, and hence no waste is generated and workability can be enhanced.

Next, modification examples (modification examples 3-1 to 3-6) of the bolt 101 according to the third embodiment are described. The same parts as those in the bolt 101 according to the third embodiment are denoted by the same reference numbers and description thereof is omitted. Only the different parts are described.

A bolt 111 according to the modification example 3-1 is described. FIG. 13 is a cross-sectional view of the bolt 111 and an inner socket 30 according to the modification example 3-1 corresponding to the cross-sectional view of the bolt 101 and the inner socket 3M taken along the XII-XII line in FIG. 11.

A pintail 26 of the bolt 111 has a hexalobular shape. The inner socket 30 has a substantially hexalobular shape in correspondence to the pintail 26.

An outer peripheral portion 27 of the pintail 26 has six deformation portions 27A and six space forming portions 27B. When the bolt 111 is fastened, each deformation portion 27A receives a torque from a pressing portion 3P of the inner socket 30 and is plastically deformed. Each space forming portion 27B forms a space 26a between the space forming portion 27B and the inner socket 30. The outer peripheral portion 27 has six deformation portions 27A and six space forming portions 27B and the inner socket 30 has six pressing portions 3P, but only one deformation portion 27A, one space forming portion 27B, and one pressing portion 3P are denoted by reference numbers in FIG. 13 for simplification of illustration.

The inner socket 30 is rotated in the rotation direction R as illustrated in FIG. 13 by the driving force from the driving source (not shown) of the wrench 3 (FIG. 1) also in this modification example. By this rotation, the pressing portions 3P of the inner socket 30 comes into contact with all the deformation portions 27A and transfers a torque to the pintail 26. Then, each deformation portion 27A is plastically deformed and displaced by the torque of the inner socket 30, the plastically deformed part of each deformation portion 27A is accommodated in the space 26a, and the inner socket 30 rotates idly.

In the bolt 111, the maximum torque applied to the plurality of deformation portions 27A in the process in which a part of each deformation portion 27A is plastically deformed by the torque from the inner socket 30 and is accommodated in the corresponding space 16a and the inner socket 30 is placed in an idle rotation state is set to be within a predetermined range. As a result, the bolt 111 can be tightened to the fastened member 4 by a desired fastening torque.

Each deformation portion 27A can be stably deformed and the inner socket 30 can be idly rotated by applying a predetermined torque to each deformation portion 27A also in the bolt 111 having the abovementioned configuration. As a result, the fastening torque can be stabilized when the bolt 111 is fastened. The bolt 111 of this modification example also achieves effects similar to those in the bolt 101 of the third embodiment.

Figure 14:
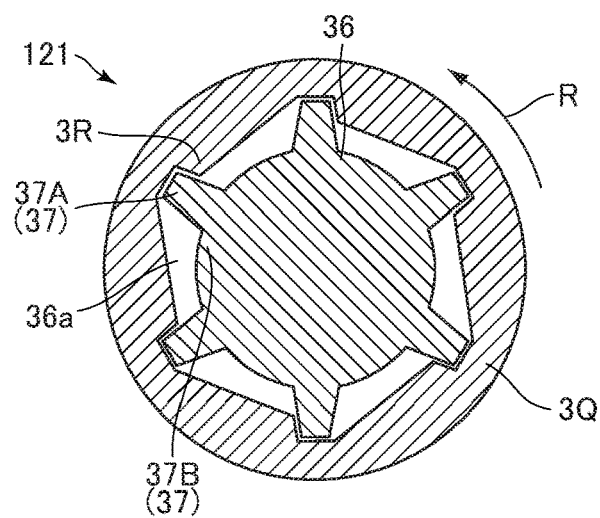
FIG. 14 is a cross-sectional view of a bolt and an inner socket according to the modification example 3-2 corresponding to the cross-sectional view of the bolt and the inner socket taken along the XII-XII line in FIG. 11.

Next, a bolt 121 according to the modification example 3-2 is described. FIG. 14 is a cross-sectional view of the bolt 121 and an inner socket 3Q according to the modification example 3-2 corresponding to the cross-sectional view of the bolt 101 and the inner socket 3M taken along the XII-XII line in FIG. 11.

A pintail 36 of the bolt 121 has a cylindrical shape. An outer peripheral portion 37 of the pintail 36 has six outwardly projecting deformation portions 37A and six space forming portions 37B. The deformation portions 37A are provided on the outer peripheral portion 37 at regular intervals in the circumferential direction thereof. When the bolt 121 is fastened, each deformation portion 37A receives a torque from a pressing portion 3R of the inner socket 3Q and is plastically deformed. Each space forming portion 37B forms a space 36a between the space forming portion 37B and the inner socket 3Q. The inner socket 3Q has six pressing portions 3R. The outer peripheral portion 37 has six deformation portions 37A and six space forming portions 37B and the inner socket 3Q has six pressing portions 3R, but only one deformation portion 37A, one space forming portion 37B, and one pressing portion 3R are denoted by reference numbers in FIG. 14 for simplification of illustration.

The inner socket 3Q is rotated in the rotation direction R as illustrated in FIG. 14 by the driving force from the driving source (not shown) of the wrench 3 (FIG. 1) also in this modification example. By this rotation, each pressing portion 3R of the inner socket 3Q comes into contact with the corresponding deformation portion 37A and transfers a torque to the leading end portion 34 of the shank 11. Then, each deformation portion 37A is plastically deformed and displaced by the torque of the inner socket 3Q, the plastically deformed part of each deformation portion 37A is accommodated in the space 36a, and the inner socket 3Q rotates idly.

In the bolt 121, the maximum torque applied to the plurality of deformation portions 37A in the process in which a part of the deformation portion 37A is plastically deformed by the torque from the inner socket 3Q and is accommodated in the space 36a and the inner socket 3Q is placed in an idle rotation state is set to be within a predetermined range. As a result, the bolt 121 can be tightened to the fastened member by a desired fastening torque.

The deformation portion 37A can be stably deformed and the inner socket 3Q can be idly rotated by applying a predetermined torque to the deformation portion 37A also in the bolt 121 having the abovementioned configuration. As a result, the fastening torque can be stabilized when the bolt 121 is fastened. The bolt 121 of this modification example also achieves other effects similar to those in the bolt 101 of the third embodiment.

Figure 15A:
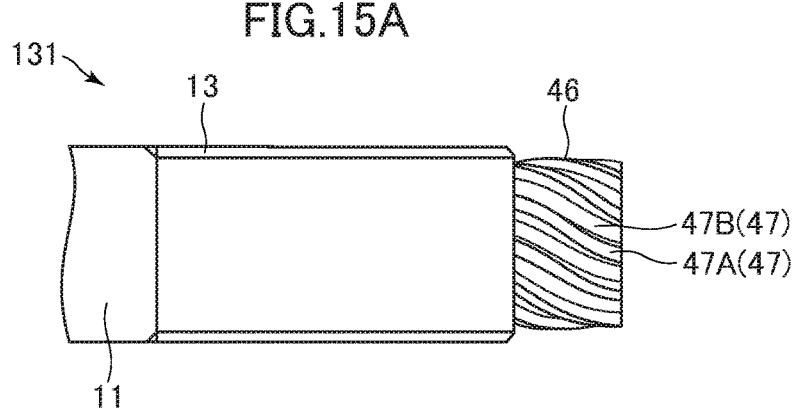
FIG. 15A is an explanatory view of a pintail according to a bolt of the modification example 3-3.

Next, a bolt 131 according to the modification example 3-3 is described. FIG. 15A is an explanatory view of a pintail 46 according to the bolt 131 of the modification example 3-3 and FIG. 15B is a cross-sectional view of the bolt 131 and an inner socket 3S according to the modification example 3-3 corresponding to the cross-sectional view of the bolt 101 and the inner socket 3M taken along the XII-XII line in FIG. 11.

Figure 15B:
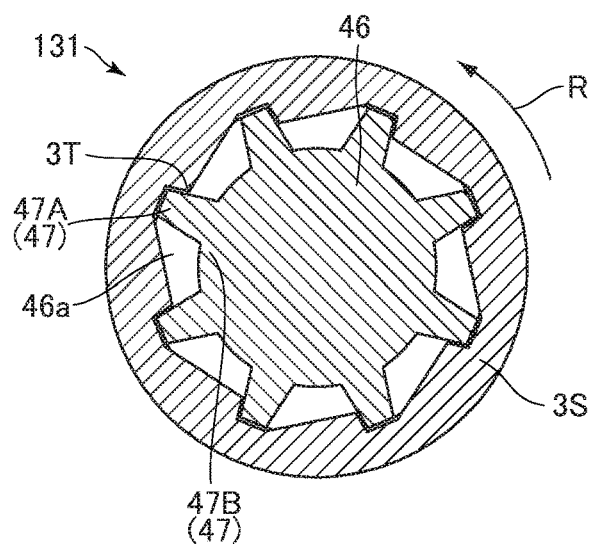
FIG. 15B is a cross-sectional view of the bolt and an inner socket 3S according to the modification example 3-3 corresponding to the cross-sectional view of the bolt and the inner socket taken along the XII-XII line in FIG. 11.

An outer peripheral portion 47 of the pintail 46 of the bolt 131 has eight outwardly projecting deformation portions 47A and eight space forming portions 47B as illustrated in FIG. 15A and FIG. 15B. The deformation portions 47A are provided on the outer peripheral portion 47 at regular intervals in the circumferential direction thereof. The deformation portions 47A are helically provided along the axial direction of the shank 11. That is, the axis (helical axis) of the deformation portion 47A forming a helical shape and the axis of the shank 11 are coaxially arranged. When the bolt 131 is fastened, the deformation portion 47A receives a torque from a pressing portion 3T of the inner socket 3S and is plastically deformed. Each space forming portion 47B forms a space 46a between the space forming portion 47B the inner socket 3S.

The inner socket 3S has eight pressing portions 3T. The pressing portions 3T are helically provided so as to correspond to the helical deformation portions 47A. The outer peripheral portion 47 has eight deformation portions 47A and eight space forming portions 47B and the inner socket 3S has eight pressing portions 3T, but only one deformation portion 47A, one space forming portion 47B, and one pressing portion 3T are denoted by reference numbers in FIG. 15A and FIG. 15B for simplification of illustration.

The inner socket 3S is rotated in the rotation direction R as illustrated in FIG. 15B by the driving force from the driving source (not shown) of the wrench 3 (FIG. 1) also in this modification example. By this rotation, each pressing portion 3T of the inner socket 3S comes into contact with the corresponding deformation portion 47A and transfers a torque to the leading end portion 54 of the shank 11. Then, each deformation portion 47A is plastically deformed and displaced by the torque of the inner socket 3S, the plastically deformed part of each deformation portion 47A is accommodated in the space 46a, and the inner socket 3S rotates idly.

In the bolt 131, the maximum torque applied to the plurality of deformation portions 47A in the process in which a part of each deformation portion 47A is plastically deformed by the torque from the inner socket 3S and is accommodated in the space 46a and the inner socket 3S is placed in an idle rotation state is set to be within a predetermined range. As a result, the bolt 131 can be tightened to the fastened member 4 by a desired fastening torque.

Each deformation portion 47A forms a helical shape and each pressing portion 3T of the inner socket 3S also forms a helical shape, and hence the inner socket 3S can be prevented from falling out of the pintail 46 when the bolt 131 is fastened. As a result, the length of the pintail 46 can become shorter, and hence the length of the bolt 131 can become shorter and the weight and the cost of the bolt 131 can be reduced. The fastening torque can be changed by changing the angle of the deformation portion 47A forming a helical shape.

Figure 16:
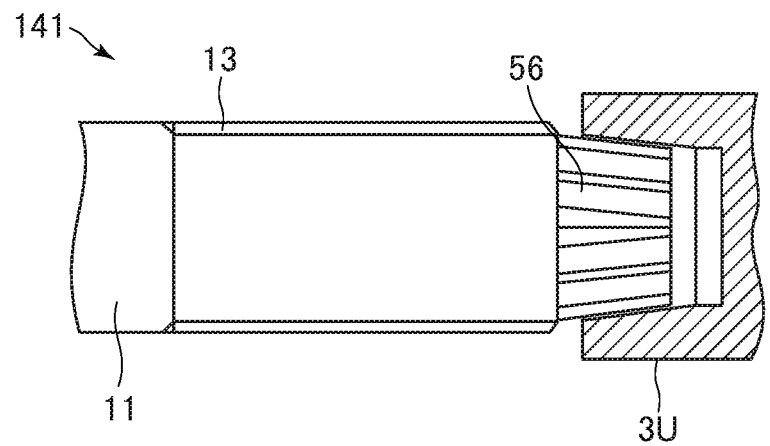
FIG. 16 is an explanatory view of a pintail and an inner socket of a bolt according to the modification example 3-4.

Next, a bolt 141 according to the modification example 3-4 is described. FIG. 16 is an explanatory view of a pintail 56 and an inner socket 3U of the bolt 141 according to the modification example 3-4.

The pintail 56 of the bolt 141 is tapered toward the leading end as illustrated in FIG. 16. An outer peripheral portion of the pintail 56 has the deformation portions and the space forming portions in any of the third embodiment and the modification examples 3-1 to 3-3. An inner peripheral surface of the inner socket 3U is tapered in correspondence to the pintail 56.

According to the bolt 141 of this modification example, it is possible to easily remove the inner socket 3U from the pintail after the bolt 141 fastened. The bolt 141 of this modification example achieves effects similar to those in the bolts in the third embodiment and modification examples 3-1 to 3-3.

Figure 17A:
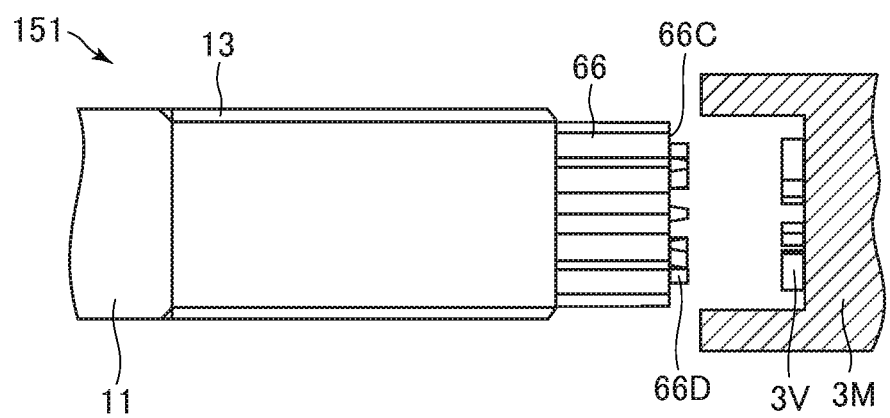
FIG. 17A is an explanatory view of a pintail and the inner socket of a bolt according to the modification example 3-5.

Next, a bolt 151 according to the modification example 3-5 is described. FIG. 17A is an explanatory view of a pintail 66 and the inner socket 3M of the bolt 151 according to the modification example 3-5 and FIG. 17B is an end view of the pintail 66.

Figure 17B:
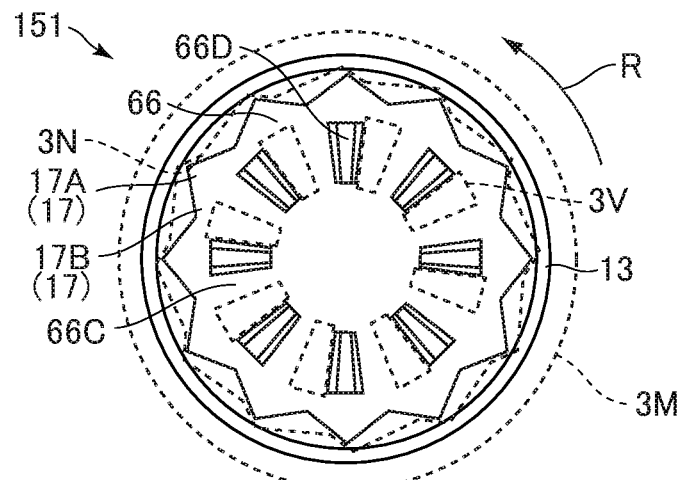
FIG. 17B is an end view of the pintail of the bolt according to the modification example 3-5.

As illustrated in FIG. 17A and FIG. 17B, the pintail 66 of the bolt 151 has a plurality of projection portions 66D (Only one projection portion 66D is denoted by a reference number in FIG. 17A and FIG. 17B.) on an end surface 66C thereof in addition to the configuration in the pintail 16 of the bolt 101 of the third embodiment.

When the bolt 151 is fastened, the inner socket 3M is rotated in the rotation direction R, the pressing portion 3N of the inner socket 3M comes into contact with the deformation portion 17A, and a pressing projection 3V provided on the inner socket 3M comes into contact with each projection portion 66D and transfers a torque to the pintail 66. Then, the projection portion 66D is plastically deformed by the torque from the inner socket 3M.

According to the bolt 151 of this modification example, not only the outer peripheral portion 17 of the pintail 66 but also the end surface 66C receives the torque of the inner socket 3M, and hence the length of the pintail 66 can become shorter and the length of the bolt 151 can become shorter. As a result, the weight and the cost of the bolt 151 can be reduced.

The outer peripheral portion of the pintail 66 may be the deformation portion and the space forming portion in any of the modification examples 3-1 to 3-3 and may be tapered. The bolt 151 of this modification example achieves effects similar to those in the bolts in the third embodiment and the modification example 3-1 to 3-4.

Figure 18A:
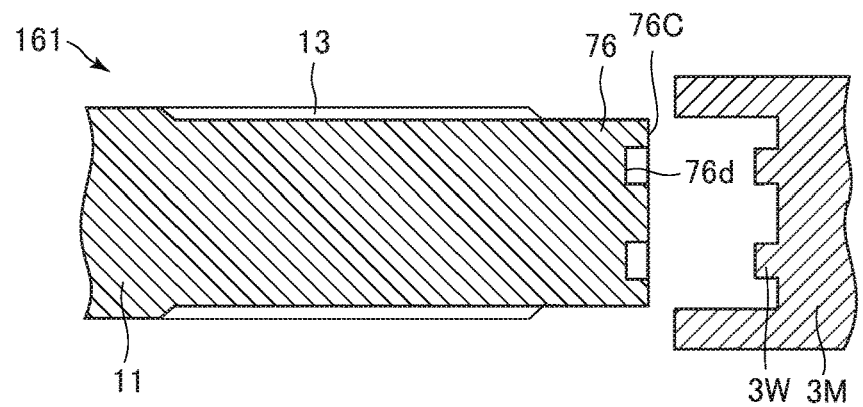
FIG. 18A is an explanatory view of a pintail and the inner socket of a bolt according to the modification example 3-6.

Next, a bolt 161 according to the modification example 3-6 is described. FIG. 18A is an explanatory view of a pintail 76 and the inner socket 3M of the bolt 161 according to the modification example 3-6 and FIG. 18B is an end view of the pintail 76 of the bolt 161.

Figure 18B:
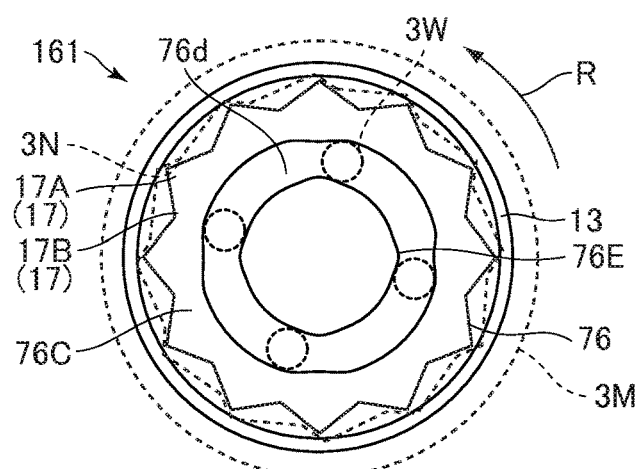
FIG. 18B is an end view of the pintail of the bolt according to the modification example 3-6.

As illustrated in FIG. 18A and FIG. 18B, the pintail 76 of the bolt 161 has an annular recessed portion 76d formed in an end surface 76C thereof in addition to the configuration in the pintail 16 of the bolt 101 of the third embodiment. The pintail 76 has four pressed portions 76E (Only one pressed portion 76E is denoted by a reference number in FIG. 18A and FIG. 18B.) that narrows the width of the recessed portion 76d. The width of the recessed portion 76d in the pressed portion 76E is smaller than the diameter of a columnar projection 3W provided in the inner socket 30.

When the bolt 161 is fastened, the columnar projection 3W is inserted in the recessed portion 76d, the inner socket 3M is rotated in the rotation direction R, each pressing portion 3N comes into contact with the corresponding deformation portion 17A, and each columnar projection 3W comes into contact with the corresponding pressed portion 76E and transfers a torque to the pintail 76. Then, each pressed portion 76E is plastically deformed by the torque from the inner socket 3M and each cylindrical projection 3W passes through the pressed portion 76E.

According to the bolt 161 of this modification example, not only the outer peripheral portion 17 of the pintail 76 but also the end surface 76C receives the torque of the inner socket 3M, and hence the length of the pintail 76 can become shorter and the length of the bolt 161 can become shorter. As a result, the weight and the cost of the bolt 161 can be reduced.

The outer peripheral portion of the pintail 76 may be the deformation portion and the space forming portion in any of the modification examples 3-1 to 3-3 and may be tapered. The bolt 161 of this modification example achieves effects similar to those in the bolts in the third embodiment and the modification example 3-1 to 3-4.

Next, a bolt 201 of a fourth embodiment of the present disclosure is described with reference to FIG. 19A and FIG. 19B. The same parts as those in the bolt 101 described in the third embodiment are denoted by the same reference numbers and description thereof is omitted. Only the different parts are described.

Figure 19A:
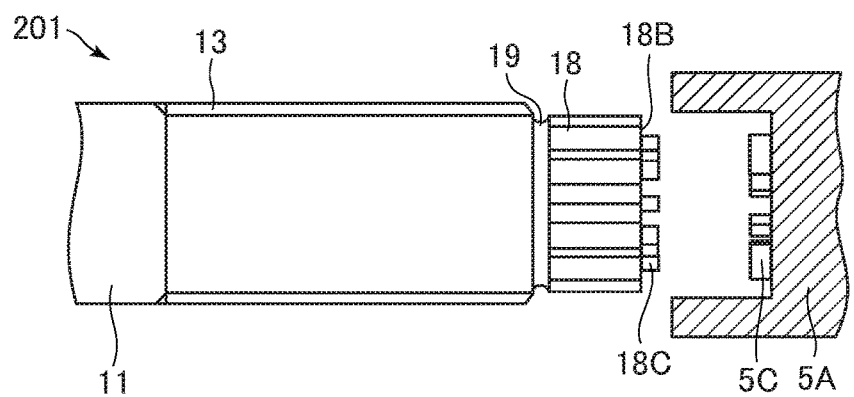
FIG. 19A is an explanatory view of a pintail and an inner socket of a bolt according to the fourth embodiment.
Figure 19B:
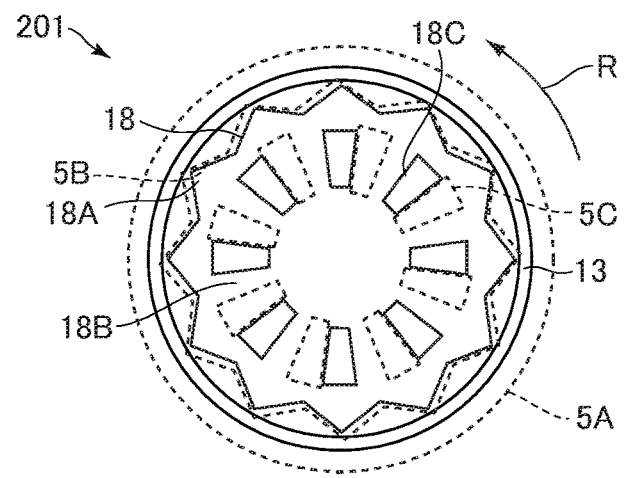
FIG. 19B is an end view of the pintail of the bolt according to the fourth embodiment.

FIG. 19A is an explanatory view of a pintail 18 and an inner socket 5A of the bolt 201 according to the fourth embodiment and FIG. 19B is an end view of the pintail 18 of the bolt 201.

In the bolt 201, the pintail 18 is provided on the leading end side of the shank 11 and an annular groove portion 19 is formed between the shank 11 and the pintail 18. The shape of the cross section of the pintail 18 orthogonal to the axis of the shank 11 is a dodecagon (non-circular shape) and the pintail 18 has 12 pressed portions 18A on an outer peripheral portion thereof. Eight projection portions (engagement portions) 18C are provided on an end surface 18B of the pintail 18. The inner socket 5A has 12 pressing portions 5B on an inner periphery thereof and eight pressing projections 5C are provided on a bottom thereof. Although 12 pressed portions 18A, 12 projection portions 18C, 12 pressing portions 5B, and 12 pressing projections 5C are provided, only one pressed portion 18A, one projection portion 18C, one pressing portion 5B, and one pressing projection 5C are denoted by reference numbers in FIG. 19A and FIG. 19B for simplification of illustration.

In this embodiment, the inner socket 5A is rotated in the rotation direction R as illustrated in FIG. 19B by rotating the inner socket 5A and the outer socket 3B (FIG. 1) in directions opposite to each other by the driving force from the driving source (not shown) of the wrench 3 (FIG. 1). By this rotation, the pressing portion 5B and the pressing projection 5C of the inner socket 5A come into contact with all the pressed portions 18A and projection portions 18C and transfer a torque to the pintail 18. Then, the groove portion 19 breaks by the torque of the inner socket 5A, the pintail 18 is removed from the shank 11, and the inner socket 5A rotates idly.

In the bolt 201, the maximum torque applied to the groove portion 19 in the process in which each pressed portion 18A and each projection portion 18C of the pintail 18 receive the torque from the inner socket 5A, the groove portion 19 breaks, and the pintail 18 is placed in a state of being removed from the shank 11 is set to be within a predetermined range. The predetermined range corresponds to a desired fastening torque range. As a result, the bolt 201 can be tightened to the fastened member 4 by a desired fastening torque. The setting of the desired fastening torque in the bolt 201 can be set as appropriate by adjusting the material of the bolt 201, the cross-sectional shape of the pintail 18, the shape of the projection portion 18C, and the like.

According to the bolt 201 having the abovementioned configuration, the torque is transferred to the pintail 18 by the plurality of projection portions 18C of the end surface 18B in addition to the plurality of pressed portions 18A of the outer peripheral portion of the pintail 18, and hence the length of the pintail 18 can become shorter. As a result, the waste and the cost can be reduced.

Next, modification examples (modification examples 4-1 to 4-2) of the bolt 201 according to the fourth embodiment are described. The same parts as those in the bolt 201 according to the fourth embodiment are denoted by the same reference numbers and description thereof is omitted. Only the different parts are described.

Figure 20A:
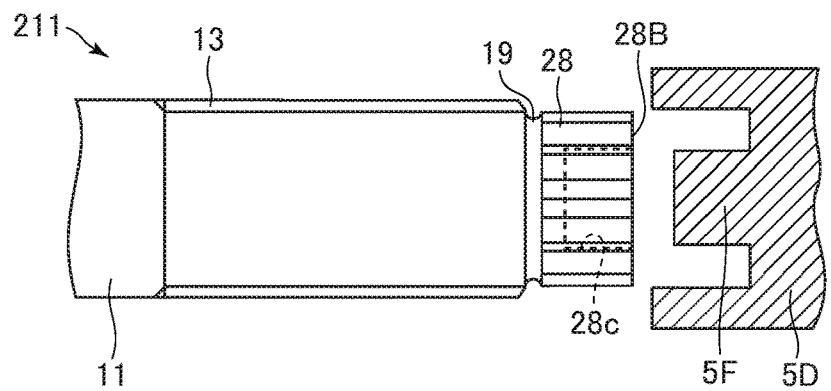
FIG. 20A is an explanatory view of a pintail and an inner socket of a bolt according to the modification example 4-1.

A bolt 211 according to the modification example 4-1 is described. FIG. 20A is an explanatory view of a pintail 28 and an inner socket 5D of the bolt 211 according to the modification example 4-1 and FIG. 20B is an end view of the pintail 28 of the bolt 211.

In the bolt 211, the pintail 28 is provided on the leading end side of the shank 11 and the annular groove portion 19 is formed between the shank 11 and the pintail 28. The shape of the cross section of the pintail 28 orthogonal to the axis of the shank 11 is a dodecagon (non-circular shape) and the pintail 28 has 12 first pressed portions 28A on an outer peripheral portion. A hole 28c, which opens on the end surface 28B and of which cross section orthogonal to the axis of the shank 11 is a hexagon (non-circular shape), is formed in the pintail 28. The part forming each corner of the hexagonal hole 28c of the pintail 28 serves as a second pressed portion 28D. The inner socket 5D has 12 first pressing portions 5E on an inner periphery thereof and has a hexagonal plug 5F provided in the inside thereof. The plug 5F has six second pressing portions 5G and is inserted in the hole 28c when the bolt 211 is fastened.

Figure 20B:
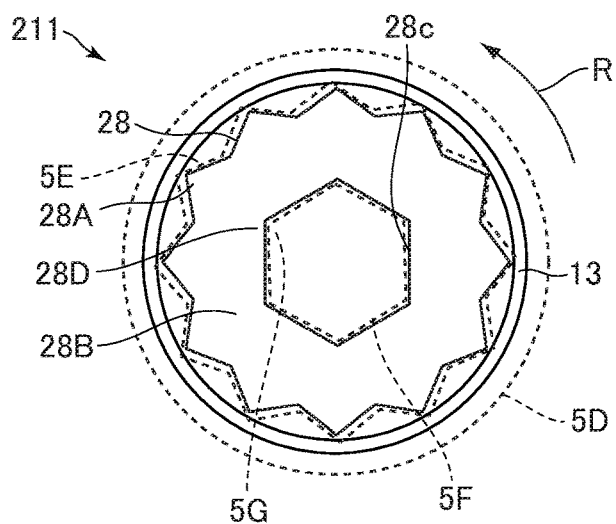
FIG. 20B is an end view of the pintail of the bolt according to the modification example 4-1.

The plurality of the first pressed portions 28A, the plurality of second pressed portions 28D, the plurality of first pressing portions 5E, and the plurality of second pressing portions 5G are provided, but only one first pressed portion 28A, one second pressed portion 28D, one first pressing portion 5E, and one second pressing portion 5G are denoted by reference numbers in FIG. 20A and FIG. 20B for simplification of illustration.

The inner socket 5D is rotated in the rotation direction R as illustrated in FIG. 20B by the driving force from the driving source (not shown) of the wrench 3 (FIG. 1) also in this modification example. By this rotation, each first pressing portion 5E and each second pressing portion 5G of the inner socket 5D come into contact with the corresponding first pressed portion 28A and the corresponding second pressed portion 28D and transfer a torque to the pintail 28. Then, the groove portion 19 breaks by the torque of the inner socket 5D, the pintail 28 is removed from the shank 11, and the inner socket 5D rotates idly.

In the bolt 211, the maximum torque applied to the groove portion 19 in the process in which each first pressed portion 28A and each second pressed portion 28D of the pintail 28 receive the torque from the inner socket 5D, the groove portion 19 breaks, and the pintail 28 is placed in a state of being removed from the shank 11 is set to be within a predetermined range. The predetermined range corresponds to a desired fastening torque range. As a result, the bolt 211 can be tightened to the fastened member 4 by a desired fastening torque.

According to the bolt 211 having the abovementioned configuration, the torque is transferred to the pintail 28 by the plurality of second pressed portions 28D in addition to the plurality of first pressed portions 28A of the outer peripheral portion of the pintail 28 and hence the length of the pintail 28 can become shorter. As a result, the waste and the cost can be reduced.

Figure 21A:
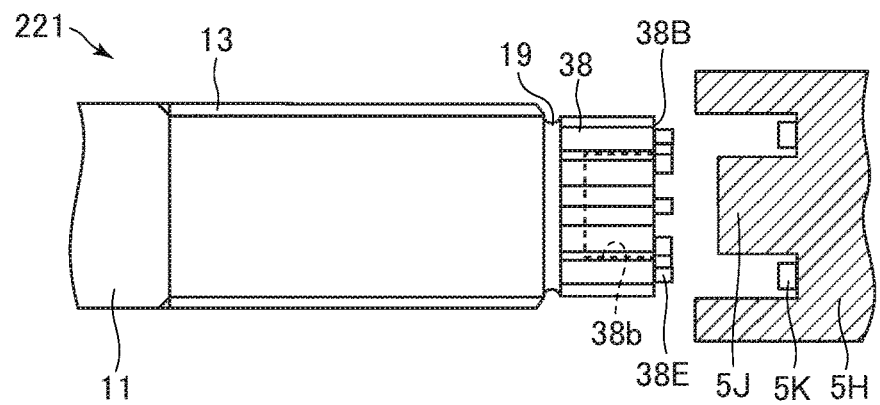
FIG. 21A is an explanatory view of a pintail and an inner socket 5H of a bolt according to the modification example 4-2.

A bolt 221 according to the modification example 4-2 is described. FIG. 21A is an explanatory view of a pintail 38 and an inner socket 5H of the bolt 221 according to the modification example 4-2 and FIG. 21B is an end view of the pintail 38 of the bolt 221.

In the bolt 221, the pintail 38 is provided on the leading end side of the shank 11 and the annular groove portion 19 is formed between the shank 11 and the pintail 38. The shape of the cross section of the pintail 38 orthogonal to the axis of the shank 11 is a dodecagon (non-circular shape) and the pintail 38 has 12 first pressed portions 38A on an outer peripheral portion. A hole 38c, which opens on an end surface 38B and of which cross section orthogonal to the axis of the shank 11 is a hexagon (non-circular shape), is formed in the pintail 38. The portion forming each corner of the hexagonal hole 38c of the pintail 38 serves as a second pressed portion 38D. Eight projection portions (engagement portions) 38E are provided on the end surface 38B of the pintail 38.

The inner socket 5H has 12 first pressing portions 51 on an inner periphery thereof and has a hexagonal plug 5J and eight pressing projections 5K provided in the inside thereof. The plug 5J has six second pressing portions 5L and is inserted in the hole 38c when the bolt 221 is fastened.

Figure 21B:
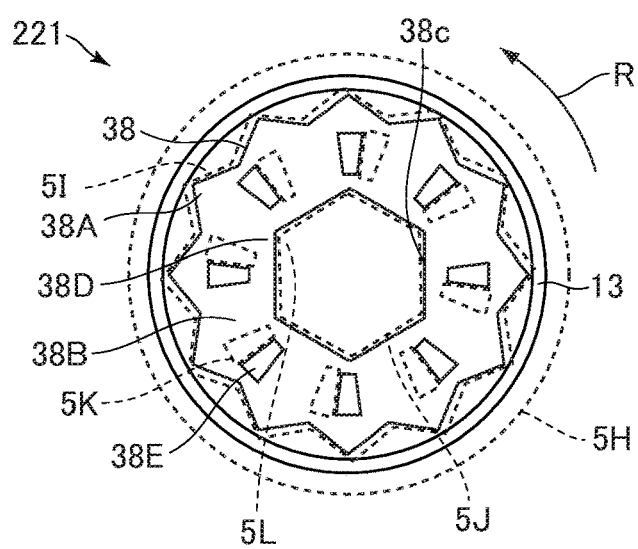
FIG. 21B is an end view of the pintail of the bolt according to the modification example 4-2.

The plurality of the first pressed portions 38A, the plurality of second pressed portions 38D, the plurality of projection portions 38E, the plurality of first pressing portions 5E, the plurality of second pressing portions 5L, and the plurality of pressing projections 5K are provided, but only one first pressed portion 38A, one second pressed portion 38D, one projection portion 38E, one first pressing portion 5E, one second pressing portion 5L, and one pressing projection 5K are denoted by reference numbers in FIG. 21A and FIG. 21B for simplification of illustration.

The inner socket 5H is rotated in the rotation direction R as illustrated in FIG. 21B by the driving force from the driving source (not shown) of the wrench 3 (FIG. 1) also in this modification example. By this rotation, each first pressing portion 5E, each second pressing portion 5L, and each pressing projection 5K of the inner socket 5H come into contact with the corresponding first pressed portion 38A, the corresponding second pressed portion 38D, and the corresponding projection portion 38E and transfer a torque to the pintail 38. Then, the groove portion 19 breaks by the torque of the inner socket 5H, the pintail 38 is removed from the shank 11, and the inner socket 5H rotates idly.

In the bolt 221, the maximum torque applied to the groove portion 19 in the process in which each first pressed portion 38A, each second pressed portion 38D, and each projection portion 38E of the pintail 38 receive the torque from the inner socket 5H, the groove portion 19 breaks, and the pintail 38 is placed in a state of being removed from the shank 11 is set to be within a predetermined range. The predetermined range corresponds to a desired fastening torque range. As a result, the bolt 221 can be tightened to the fastened member 4 by a desired fastening torque.

According to the bolt 221 having the abovementioned configuration, the torque is transferred to the pintail 38 by the plurality of second pressed portions 38D and the plurality of projection portions 38E of the end surface 38B in addition to the plurality of first pressed portions 38A of an outer peripheral portion of the pintail 38, and hence the length of the pintail 38 can become shorter. As a result, the waste and the cost can be reduced.

In the fourth embodiment and the modification examples thereof, the shapes of the cross sections of the pintails 18, 28, and 38 orthogonal to the axis of the shank 11 have dodecagonal shapes, but may have a hexagonal or a hexalobular shape. In the same manner, the shapes of the cross sections of the holes 28c and 38c formed in the pintails 28 and 38 orthogonal to the axis of the shank 11 are hexagons, but may be dodecagonal hole shapes or hexalobular shapes.

Next, a bolt 301 of a fifth embodiment of the present disclosure is described with reference to FIG. 22A and FIG. 22B. The same parts as those described in the bolt 1 of the first embodiment 1 are denoted by the same reference numbers and description thereof is omitted. Only the different parts are described.

Figure 22A:
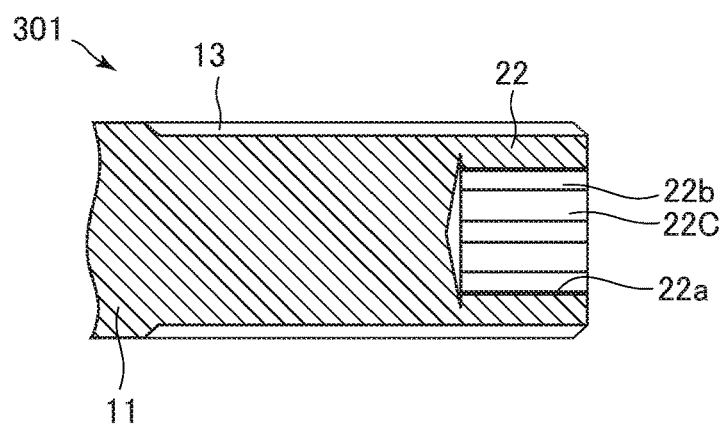
FIG. 22A is a cross-sectional view of a part near a leading end portion of a bolt according to the fifth embodiment taken along a plane including the axis of the shank.
Figure 22B:
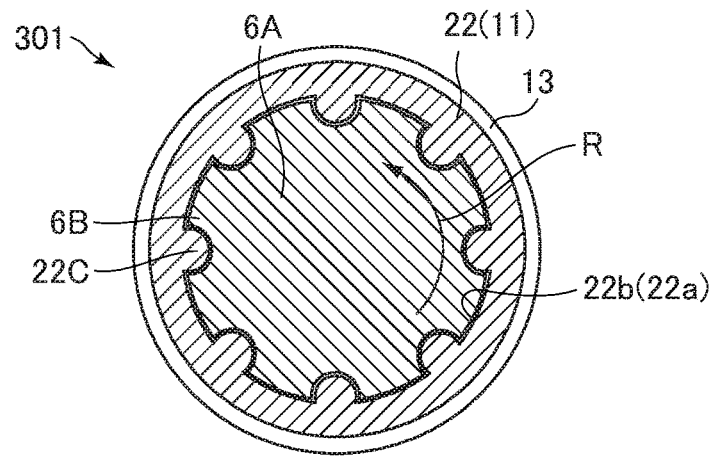
FIG. 22B is a cross-sectional view of the bolt and an inner plug according to the fifth embodiment corresponding to the cross-sectional view of the bolt and the inner socket taken along the line in FIG. 1.

FIG. 22A is a cross-sectional view of a part near a leading end portion of the bolt 301 according to the fifth embodiment taken along a plane including the axis of the shank 11 and FIG. 22B is a cross-sectional view of the bolt 301 and an inner plug 6A according to the fifth embodiment corresponding to the cross-sectional view of the bolt 1 and the inner socket 3A taken along the line in FIG. 1.

A hole 22a is formed in a leading end portion 22 of the shank 11 of the bolt 301. Eight inwardly projecting protrusion portions 22C are provided on a wall surface 22b of the hole 22a. The protrusion portions 22C are provided on the wall surface 22b at regular intervals in the circumferential direction of the leading end portion 22. When the bolt 301 is fastened, each protrusion portion 22C receives a torque from a pressing portion 6B of the inner plug 6A and breaks from the wall surface 22b. Eight protrusion portions 22C are provided on the wall surface 22b of the hole 22a and the inner plug 6A has eight pressing portions 6B, but only one protrusion portion 22C and one pressing portion 6B are denoted by reference numbers in FIG. 22A and FIG. 22B for simplification of illustration.

In this embodiment, the inner plug 6A is rotated in the rotation direction R as illustrated in FIG. 22B by rotating the inner plug 6A and the outer socket 3B (FIG. 1) in directions opposite to each other by the driving force from the driving source (not shown) of the wrench 3 (FIG. 1). By this rotation, each pressing portion 6B of the inner plug 6A comes into contact with the corresponding protrusion portion 22C and transfers a torque to the leading end portion 34 of the shank 11. Then, each protrusion portion 22C breaks from the wall surface 22b by the torque of the inner plug 6A and the inner plug 6A rotates idly.

In the bolt 301, the maximum torque applied to the plurality of protrusion portions 22C in the process in which the plurality of protrusion portions 22C receives a torque from the inner plug 6A and breaks from the wall surface 22b and the inner plug 6A is placed in an idle rotation state is set to be within a predetermined range. The predetermined range corresponds to a desired fastening torque range. As a result, the bolt 301 can be tightened to the fastened member 4 by a desired fastening torque. The setting of the desired fastening torque can be set as appropriate by adjusting the material of the bolt 301, the size of the protrusion portion 22C, and the like.

According to the bolt 301 of this embodiment, the amount of waste can be smaller than that in the case in which the desired fastening torque is acquired by breaking the pintail. Thus, risks caused by falling wastes can be reduced when the bolt 301 is used at a high place. The bolt 301 has a structure without a pintail, and hence the weight of the bolt 301 can be decreased and the cost can be reduced.

Next, modification examples (modification examples 5-1 to 5-3) of the bolt 301 according to the fifth embodiment are described. The same parts as those in the bolt 301 according to the fifth embodiment are denoted by the same reference numbers and description thereof is omitted. Only the different parts are described.

Figure 23A:
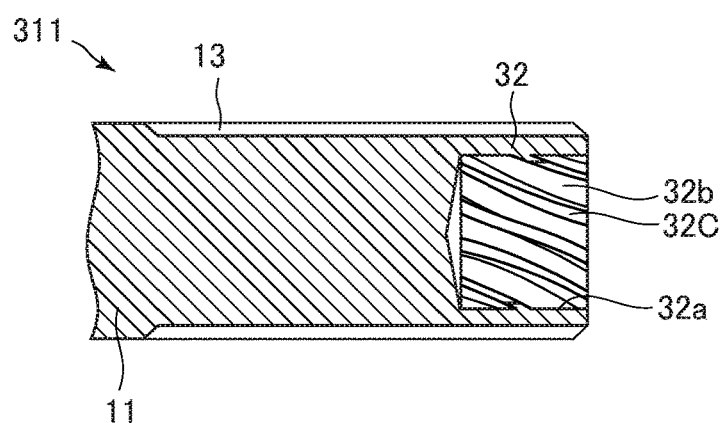
FIG. 23A is a cross-sectional view of a part near a leading end portion of a bolt according to the modification example 5-1 taken along a plane including the shaft of the shank.

A bolt 311 according to the modification example 5-1 is described. FIG. 23A is a cross-sectional view of a part near a leading end portion 32 of the bolt 311 according to the modification example 5-1 taken along a plane including the shaft of the shank 11 and FIG. 23B is a cross-sectional view of the bolt 311 and an inner plug 6C according to the modification example 5-1 corresponding to the cross-sectional view of the bolt 1 and the inner socket 3A taken along the line in FIG. 1.

A hole 32a is formed in the leading end portion 32 of the shank 11 of the bolt 311. Eight inwardly projecting protrusion portions 32C are provided on a wall surface 32b of the hole 32a. The protrusion portions 32C are provided on the wall surface 32b at regular intervals in the circumferential direction of the leading end portion 32. The protrusion portions 32C are helically provided along the axial direction of the shank 11. That is, the axis (helical axis) of the protrusion portion 32C forming a helical shape and the axis of the shank 11 are coaxially arranged. When the bolt 311 is fastened, each protrusion portion 32C receives a torque from a pressing portion 6D of the inner plug 6C and breaks from the wall surface 32b.

The inner plug 6C has eight pressing portions 6D. The pressing portions 6D are helically provided so as to correspond to the helical protrusion portions 32C. Eight protrusion portions 32C are provided on the wall surface 32b of the hole 32a and the inner plug 6C has eight pressing portions 6D, but only one protrusion portion 32C and one pressing portion 6B are denoted by reference numbers in FIG. 23A and FIG. 23B for simplification of illustration.

Figure 23B:
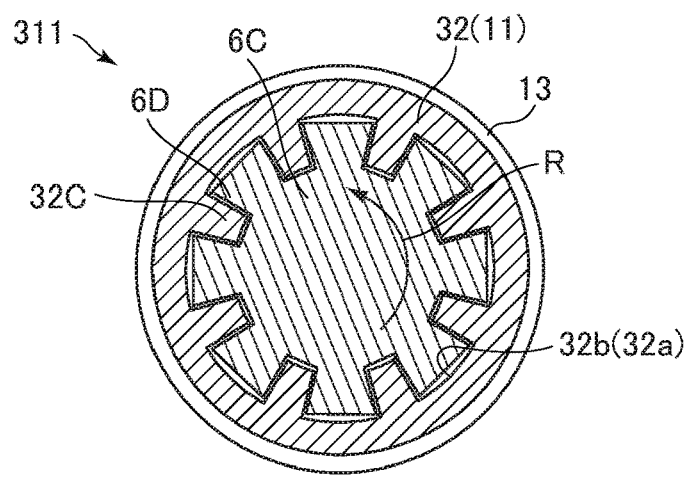
FIG. 23B is a cross-sectional view of the bolt and an inner plug according to the modification example 5-1 corresponding to the cross-sectional view of the bolt and the inner socket taken along the line in FIG. 1.

The inner plug 6C is rotated in the rotation direction R as illustrated in FIG. 23B by the driving force from the driving source (not shown) of the wrench 3 (FIG. 1) also in this modification example. By this rotation, each pressing portion 6D of the inner plug 6C comes into contact with the corresponding protrusion portion 32C and transfers a torque to the leading end portion 32 of the shank 11. Then, each protrusion portion 32C breaks from the wall surface 32b by the torque of the inner plug 6C and the inner plug 6C rotates idly.

The maximum torque applied to the plurality of protrusion portions 32C in the process in which each protrusion portion 32C receives a torque from the inner plug 6C and breaks from the wall surface 32b and the inner plug 6C is placed in an idle rotation state is set to be within a predetermined range. The predetermined range corresponds to a desired fastening torque range. As a result, the bolt 311 can be tightened to the fastened member 4 by a desired fastening torque.

Each protrusion portion 32C forms a helical shape and each pressing portion 6D of the inner plug 6C also forms a helical shape, and hence the inner plug 6C can be prevented from falling out of the hole 32a when the bolt 311 is fastened. As a result, the depth of the hole 32a can be reduced, and hence the length of the bolt 311 can become shorter and the weight and the cost of the bolt 311 can be reduced. The fastening torque can be changed by changing the angle forming the helical shape of each protrusion portion 32C. The bolt 311 having the abovementioned configuration achieves effects similar to those in the bolt 301 of the fifth embodiment.

Figure 24A:
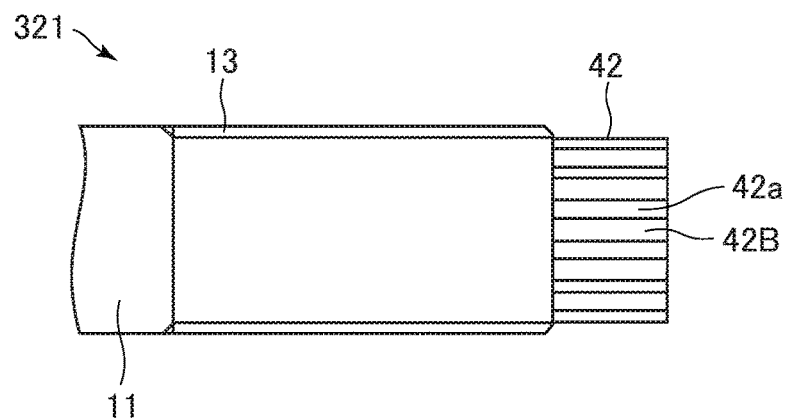
FIG. 24A is an explanatory view of a pintail of a bolt according to the modification example 5-2.

A bolt 321 according to the modification example 5-2 is described. FIG. 24A is an explanatory view of a pintail 42 of the bolt 321 according to the modification example 5-2 and FIG. 24B is a cross-sectional view of the bolt 321 and an inner socket 6E according to the modification example 5-2 corresponding to the cross-sectional view of the bolt 101 and the inner socket 3M taken along the XII-XII line in FIG. 11.

In the bolt 321, the pintail 42 is provided on the leading end side of the shank 11. The pintail 42 is inserted in the cylindrical inner socket 6E when the bolt 321 is fastened. On an outer peripheral surface 42A of the pintail 42, 12 outwardly projecting protrusion portions 42B are provided. The protrusion portions 42B are provided on the outer peripheral surface 42A of the pintail 42 at regular intervals in the circumferential direction of the pintail 42. When the bolt 321 is fastened, each protrusion portion 42B receives a torque from each pressing portion 6F of the inner socket 6E and breaks from the outer peripheral surface 42A. The pintail 42 has 12 protrusion portions 42B and the inner socket 6E has 12 pressing portions 6F, but only one protrusion portion 42B and one pressing portion 6F are denoted by reference numbers in FIG. 24A and FIG. 24B for simplification of illustration.

Figure 24B:
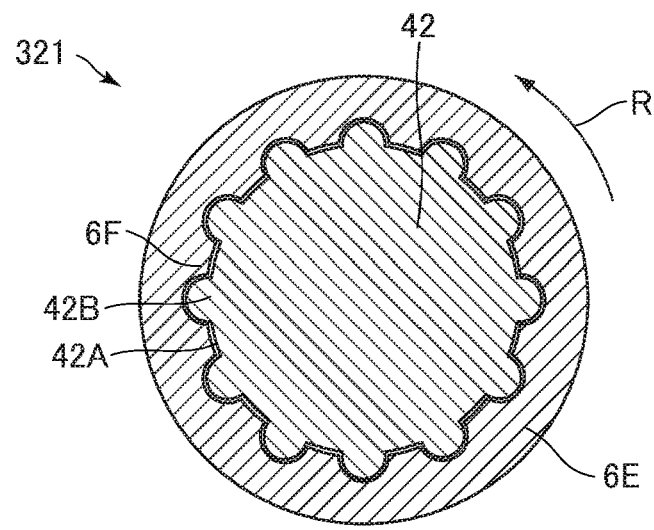
FIG. 24B is a cross-sectional view of the bolt and an inner socket according to the modification example 5-2 corresponding to the cross-sectional view of the bolt and the inner socket aken along the XII-XII line in FIG. 11.

The inner socket 6E is rotated in the rotation direction R as illustrated in FIG. 24B by the driving force from the driving source (not shown) of the wrench 3 (FIG. 1) also in this modification example. By this rotation, each pressing portion 6F of the inner socket 6E comes into contact with the corresponding protrusion portion 42B and transfers a torque to the pintail 42. Then, each protrusion portion 42B breaks from the outer peripheral surface 42A by the torque of the inner socket 6E and the inner socket 6E rotates idly.

In the bolt 321, the maximum torque applied to the plurality of protrusion portions 42B in the process in which each protrusion portion 42B receives a torque from the inner socket 6E and breaks from the outer peripheral surface 42A and the inner socket 6E is placed in an idle rotation state is set to be within a predetermined range. As a result, the bolt 321 can be tightened to the fastened member 4 by a desired fastening torque.

The bolt 321 of this modification example achieves effects similar to those in the bolt 301 according to the fifth embodiment.

Figure 25A:
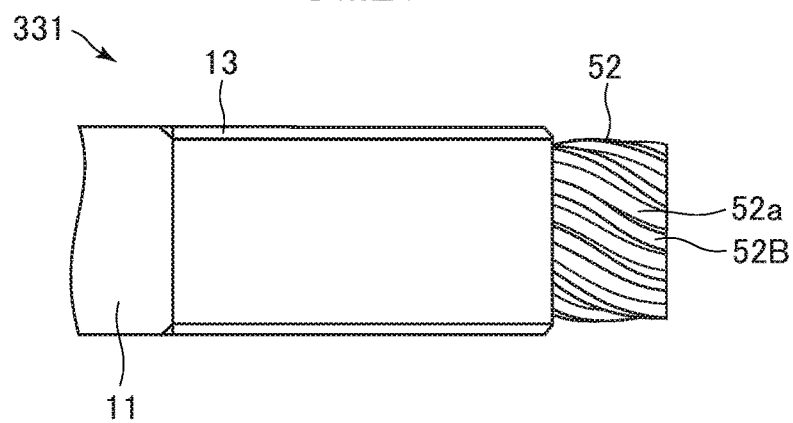
FIG. 25A is an explanatory view of a pintail of a bolt according to the modification example 5-3.

Next, a bolt 331 according to the modification example 5-3 is described. FIG. 25A is an explanatory view of a pintail 52 of the bolt 331 according to the modification example 5-3 and FIG. 25B is a cross-sectional view of the bolt 331 and an inner socket 6G according to the modification example 5-3 corresponding to the cross-sectional view of the bolt 101 and the inner socket 3M taken along the XII-XII line in FIG. 11.

Figure 25B:
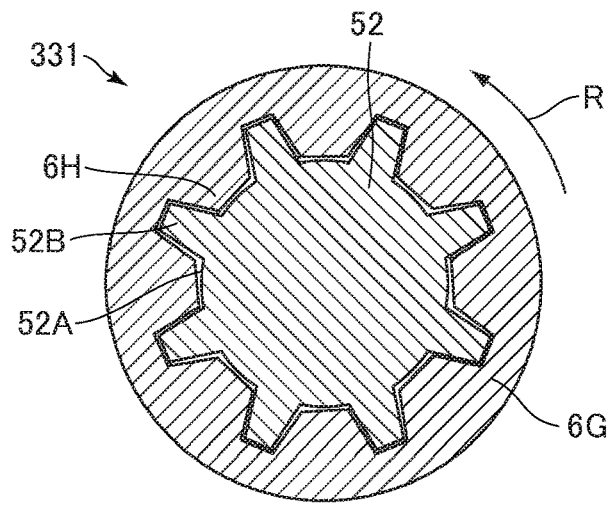
FIG. 25B is a cross-sectional view of the bolt and an inner socket according to the modification example 5-3 corresponding to the cross-sectional view of the bolt and the inner socket taken along the XII-XII line in FIG. 11.

Eight outwardly projecting protrusion portions 52B are provided on an outer peripheral surface 52A of the pintail 52 of the bolt 331 as illustrated in FIG. 25A and FIG. 25B. The protrusion portions 52B are provided on the outer peripheral surface 52A at regular intervals in the circumferential direction thereof. The protrusion portions 52B are helically provided along the axial direction of the shank 11. That is, the axis (helical axis) forming a helical shape of the protrusion portion 52B and the axis of the shank 11 are coaxially arranged. When the bolt 331 is fastened, each protrusion portion 52B receives a torque from a pressing portion 6H of the inner socket 6G and breaks from the outer peripheral surface 52A.

The inner socket 6G has eight pressing portions 6H. The pressing portions 6H are helically provided so as to correspond to the helical protrusion portions 52B. Eight protrusion portions 52B are provided on the outer peripheral surface 52A and the inner socket 6G has eight pressing portions 6H, but only one protrusion portion 52B and one pressing portion 6H are denoted by reference numbers in FIG. 25A and FIG. 25B for simplification of illustration.

The inner socket 6G is rotated in the rotation direction R as illustrated in FIG. 25B by the driving force from the driving source (not shown) of the wrench 3 (FIG. 1) also in this modification example. By this rotation, each pressing portion 6H of the inner socket 6G comes into contact with the corresponding protrusion portion 52B and transfers a torque to the pintail 52. Then, each protrusion portion 52B breaks from the outer peripheral surface 52A by the torque of the inner socket 6G and the inner socket 6G rotates idly.

In the bolt 331, the maximum torque applied to the plurality of protrusion portions 52B in the process in which each protrusion portion 52B receives a torque from the inner socket 6G and breaks from the outer peripheral surface 52A and the inner socket 6G is placed in an idle rotation state is set to be within a predetermined range. As a result, the bolt 331 can be tightened to the fastened member 4 by a desired fastening torque.

Each protrusion portion 52B forms a helical shape and each pressing portion 6H of the inner socket 6G also forms a helical shape, and hence the inner socket 6G can be prevented from falling out of the pintail 52 when the bolt 331 is fastened. As a result, the length of the pintail 52 can become shorter, and hence the length of the bolt 331 can become shorter and the weight and the cost of the bolt 331 can be reduced. The fastening torque can be changed by changing the angle forming a helical shape of the protrusion portion 52B.

Figure 26:
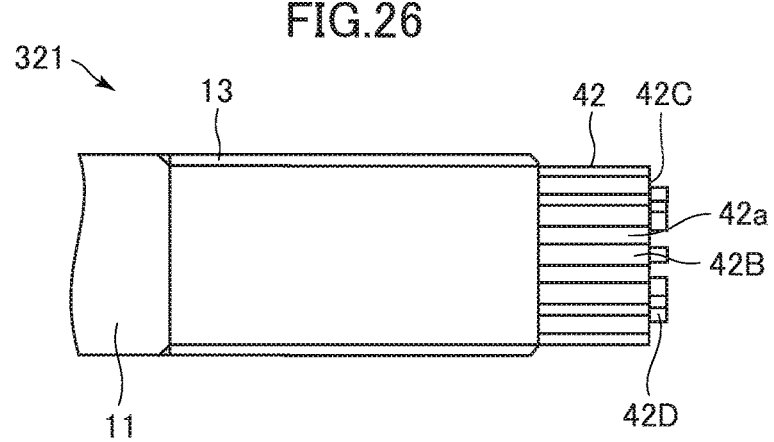
FIG. 26 is a side view of the pintail provided with a plurality of end surface protrusion portions of the bolt according to the modification example 5-2.

The bolt 331 having the abovementioned configuration achieves effects similar to those in the bolt 301 of the fifth embodiment. In the fifth embodiment and the modification example 5-1, the shapes of the holes 22a and 32a in the leading end portions 22 and 32 are linear shapes (substantially cylindrical shapes) along the axis of the shank 11, but may be tapered shapes. In the same manner, in the modification examples 5-2 and 5-3, the shapes of the pintails 42 and 52 are linear shapes (substantially cylindrical shapes) along the axis of the shank 11, but may be tapered shapes. In the fifth embodiment and the modification example 5-1, each length of the leading end portions 22 and 32 in the direction orthogonal to the axis of the shank 11 may be shorter than the diameter of the male screw portion 13 in the same manner as the bolt 71 according to the modification example 1-6. As illustrated in FIG. 26, a plurality of end surface protrusion portions 42D may be provided on an end surface 42C of the pintail 42 of the bolt 321 and the plurality of end surface protrusion portions 42D may be broken in addition to the plurality of protrusion portions 42B when the bolt 321 fastened. As a result, the pintail 42 can become shorter.

Next, a bolt 401 of a sixth embodiment of the present disclosure is described with reference to FIG. 27A and FIG. 27B. The same parts as those in the bolt 1 described in the first embodiment are denoted by the same reference numbers and description thereof is omitted. Only the different parts are described.

Figure 27A:
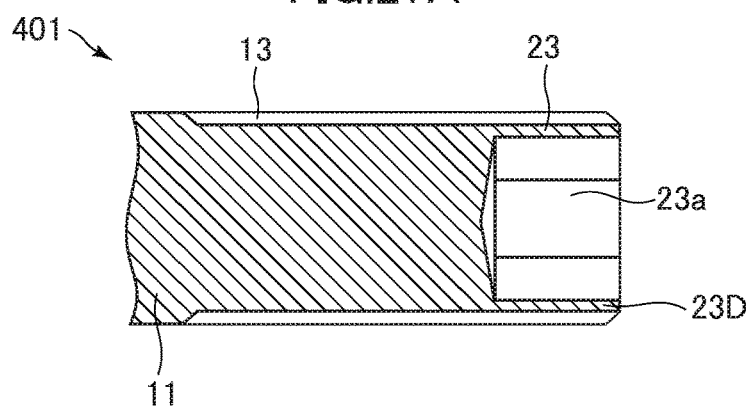
FIG. 27A is a cross-sectional view of a part near a leading end portion of a bolt 401 according to the sixth embodiment taken along a plane including the shaft of the shank.
Figure 27B:
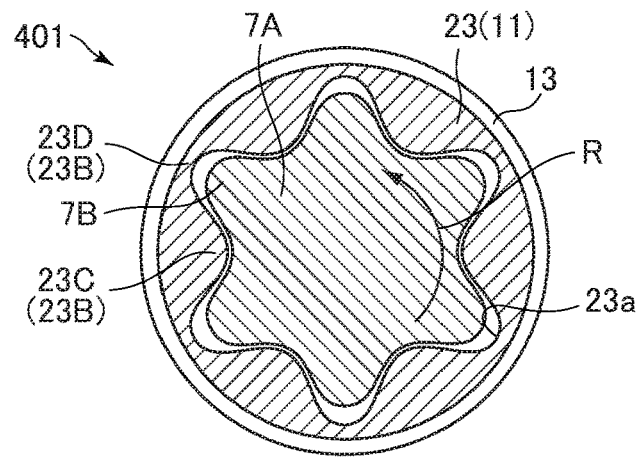
FIG. 27B is a cross-sectional view of the bolt and an inner plug according to the sixth embodiment corresponding to the cross-sectional view of the bolt and the inner socket taken along the line in FIG. 1.

FIG. 27A is a cross-sectional view of a part near a leading end portion 23 of the bolt 401 according to the sixth embodiment taken along a plane including the shaft of the shank 11 and FIG. 27B is a cross-sectional view of the bolt 401 and an inner plug 7A according to the sixth embodiment corresponding to the cross-sectional view of the bolt 1 and the inner socket 3A taken along the line in FIG. 1.

A hexalobular hole 23a is formed in the leading end portion 23 of the shank 11 of the bolt 401. The inner plug 7A has a hexalobular shape in correspondence to the hole 23a.

A wall portion 23B forming the hole 23a in the leading end portion 23 has six pressed portions 23C and six extension portions 23D. When the bolt 401 is fastened, each pressed portion 23C receives a torque from a pressing portion 7B of the inner plug 7A and is pushed outward. Each extension portion 23D is plastically deformed and extended by the torque from the inner plug 7A. The wall portion 23B forming the hole 23a has six pressed portions 23C and six extension portions 23D and the inner plug 7A has six pressing portions 7B, but only one pressed portion 23C, one extension portion 23D, and one pressing portion 7B are denoted by reference numbers in FIG. 27A and FIG. 27B for simplification of illustration.

Figure 28:
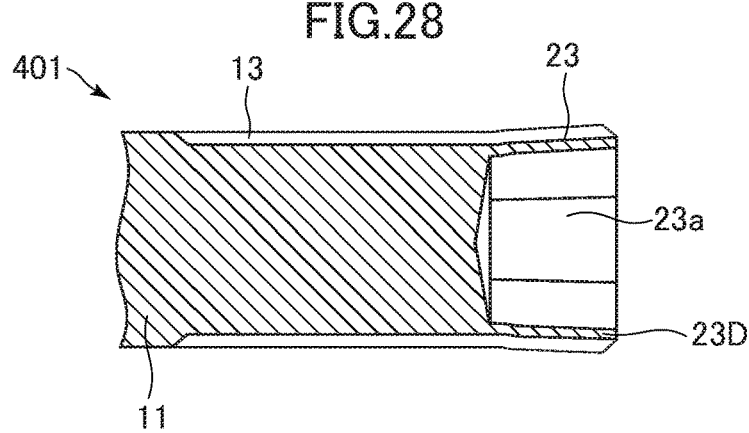
FIG. 28 is a view illustrating a leading end portion of the bolt according to the sixth embodiment in a state after fastening.

In this embodiment, the inner plug 7A and the outer socket 3B (FIG. 1) are rotated in directions opposite to each other by the driving force from the driving source (not shown) of the wrench 3 (FIG. 1). The inner plug 7A is rotated in the rotation direction R as illustrated in FIG. 27B. By this rotation, each pressing portion 7B of the inner plug 7A comes into contact with the corresponding pressed portion 23C and transfers a torque to the leading end portion 23 of the shank 11. Then, each pressed portion 23C is pressed by the corresponding pressing portion 7B. Consequently, each extension portion 23D is plastically deformed and extended, each pressed portion 23C is extruded outward, the entire leading end portion 23 is deformed so as to expand, and the inner plug 7A rotates idly. As a result, the shape of the leading end portion 23 of the bolt 401 expands as illustrated in FIG. 28.

In the bolt 401, the maximum torque applied to the pressed portion 23C in the process in which each pressed portion 23C receives a torque from the inner plug 7A and is extruded outward, the entire shape of the leading end portion 23 expands in the direction orthogonal to the axis of the shank 11, and the inner plug 7A is placed in an idle rotation state is set to be within a predetermined range. The predetermined range corresponds to a desired fastening torque range. As a result, the bolt 401 can be tightened to the fastened member 4 by a desired fastening torque. The setting of the desired fastening torque in the bolt 401 can be set as appropriate by adjusting the material of the bolt 401, the depth of the hole 23a, the shapes of each pressed portion 23C and each extension portion 23D, and the like.

The maximum length of the leading end portion 23 in the direction orthogonal to the axis of the shank 11 after the expansion of the shape of the leading end portion 23 is longer than the inner diameter of the nut 2. Thus, according to the bolt 401 of this embodiment, loosening and falling of the nut 2 can be prevented after the bolt 401 is fastened. The bolt 401 of this embodiment has a structure without a pintail, and hence the weight of the bolt 401 can be decreased and the cost can be reduced. In the bolt 401 of this embodiment, no waste is generated and workability can be enhanced.

Next, modification examples (modification examples 6-1 to 6-3) of the bolt 401 according to the sixth embodiment are described. The same parts as those in the bolt 401 according to the sixth embodiment are denoted by the same reference numbers and description thereof is omitted. Only the different parts are described.

Figure 29:
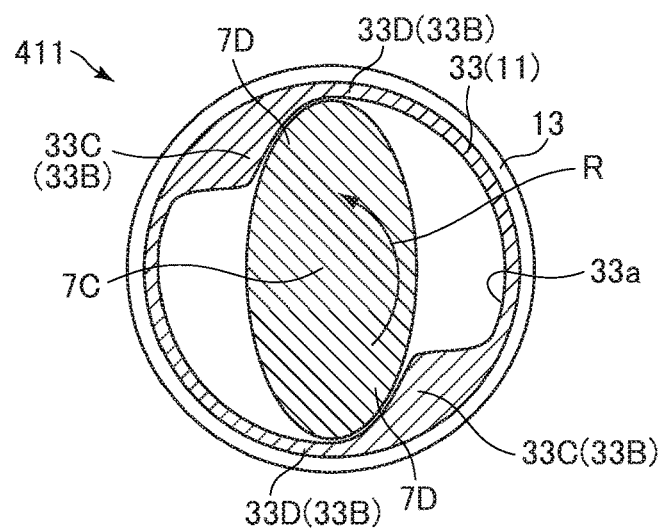
FIG. 29 is a cross-sectional view of a bolt and an inner plug according to the modification example 6-1 corresponding to the cross-sectional view of the bolt and the inner socket taken along the line in FIG. 1.

A bolt 411 according to the modification example 6-1 is described. FIG. 29 is a cross-sectional view of the bolt 411 and an inner plug 7C according to the modification example 6-1 corresponding to the cross-sectional view of the bolt 1 and the inner socket 3A taken along the line in FIG. 1.

A hole 33a is formed in a leading end portion 33 of the shank 11 of the bolt 411. A wall portion 33B forming the hole 33a in the leading end portion 33 has two inwardly projecting pressed portions 33C and two extension portions 33D. Each pressed portion 33C receives a torque from a pressing portion 7D of the inner plug 7C and is pushed outward when the bolt 411 is fastened. Each extension portion 33D is plastically deformed and extended by the torque from the inner plug 7C.

The inner plug 7C is rotated in the rotation direction R as illustrated in FIG. 29 by the driving force from the driving source (not shown) of the wrench 3 (FIG. 1) also in this modification example. By this rotation, each pressing portion 7D of the inner plug 7C comes into contact with the corresponding pressed portion 33C and transfers a torque to the leading end portion 33 of the shank 11. Then, each pressed portion 33C is pressed by each pressing portion 7D. Consequently, each extension portion 33D is plastically deformed and extended, each pressed portion 33C is extruded outward, the entire leading end portion 33 is deformed so as to expand, and the inner plug 7C rotates idly. As a result, a part of the shape of the leading end portion 33 of the bolt 411 expands.

In the bolt 411, the maximum torque applied to the pressed portion 33C in the process in which each pressed portion 33C receives a torque from the inner plug 7C and is extruded outward, a part of the shape of the leading end portion 33 expands in the direction orthogonal to the axis of the shank 11, and the inner plug 7C is placed in an idle rotation state is set to be within a predetermined range. As a result, the bolt 411 can be tightened to the fastened member 4 by a desired fastening torque.

The bolt 411 of this modification example also achieves effects similar to those in the bolt 401 of the sixth embodiment.

Figure 30:
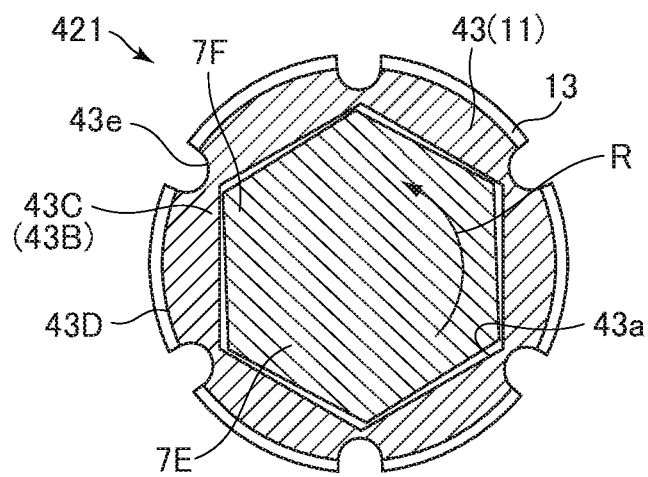
FIG. 30 is a cross-sectional view of a bolt and an inner plug according to the modification example 6-2 corresponding to the cross-sectional view of the bolt and the inner socket taken along the line in FIG. 1.

Next, a bolt 421 according to the modification example 6-2 is described. FIG. 30 is a cross-sectional view of the bolt 421 and an inner plug 7E according to the modification example 6-2 corresponding to the cross-sectional view of the bolt 1 and the inner socket 3A taken along the line in FIG. 1.

A hexagonal hole 43a is formed in a leading end portion 43 of the shank 11 of the bolt 421. A wall portion 43B forming the hole 43a of the leading end portion 43 has six pressed portions 43C. Each pressed portion 43C is located on the downstream side of each corner portion of the hexagonal hole 43a in the rotation direction R of the inner plug 7E. The inner plug 7E has a hexagonal cross section and a pressing portion 7F that presses each pressed portion 43C. A groove 43e extending from an end surface of the leading end portion 43 toward the head 12 side is formed in an outer peripheral surface 43D of the leading end portion 43 at a location corresponding to each corner portion of the hole 43a. The leading end portion 43 has six pressed portions 43C and six grooves 43e and the inner plug 7E has six pressing portions 7E, but only one pressed portion 43C, one groove 43e, and one pressing portion 7F are denoted by reference numbers in FIG. 30 for simplification of illustration.

The inner plug 7E is rotated in the rotation direction R as illustrated in FIG. 29 by the driving force from the driving source (not shown) of the wrench 3 (FIG. 1) also in this modification example. By this rotation, each pressing portion 7F of the inner plug 7E comes into contact with the corresponding pressed portion 43C and transfers a torque to the leading end portion 43 of the shank 11. Then, each pressed portion 43C is pressed by the corresponding pressing portion 7F. Consequently, the leading end portion 43 breaks along each groove 43e, each pressed portion 43C is extruded outward, the entire leading end portion 43 is deformed so as to expand, and the inner plug 7C rotates idly. As a result, the shape of the leading end portion 43 of the bolt 421 expands.

The bolt 421 of this modification example also achieves effects similar to those in the bolt 401 of the sixth embodiment.

Figure 31A:
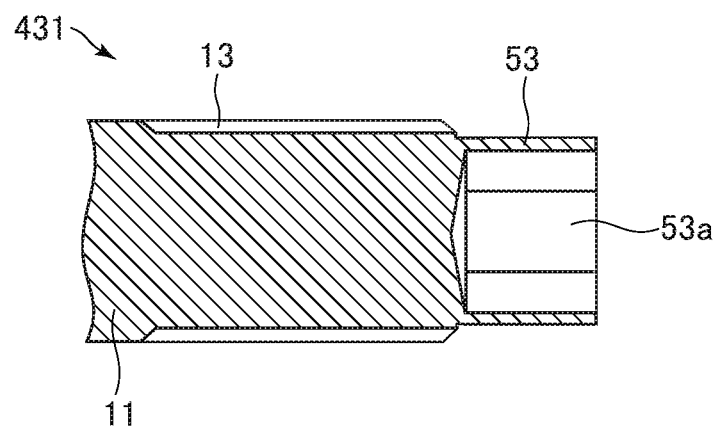
FIG. 31A is a view illustrating a leading end portion of a bolt according to the modification example 6-3 in a state before fastening.
Figure 31B:
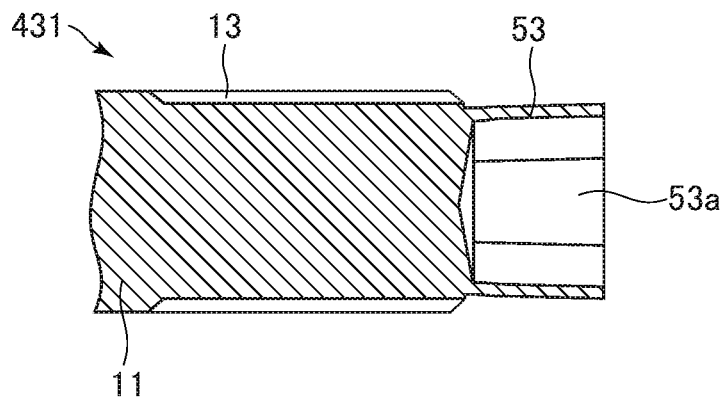
FIG. 31B is a view illustrating the leading end portion of the bolt according to the modification example 6-3 in a state after fastening.

Next, a bolt 431 according to the modification example 6-3 is described. FIG. 31A is a view illustrating a leading end portion 53 of the bolt 431 according to the modification example 6-3 in a state before fastening and FIG. 31B is a view illustrating the leading end portion 53 of the bolt 431 according to the modification example 6-3 in a state after fastening.

A hole 53a is formed in the leading end portion 53 of the shank 11 of the bolt 431. The screw portion 13 is not formed on the outer periphery of the leading end portion 53. The maximum length of the leading end portion 53 in the direction orthogonal to the axis of the shank 11 after the expansion of the shape of the leading end portion 53 is shorter than the inner diameter of the nut 2 as illustrated in FIG. 31B. As a result, it is possible to easily remove the nut 2 according to the bolt 431 according to this modification example.

The above-mentioned embodiments of the present disclosure is merely exemplified for description of the present disclosure and is not intended to limit the scope of the present disclosure to only those described in the embodiments. A person skilled in the art could embody the present disclosure in other various modes without departing from the gist of the present disclosure.

Figure 32:
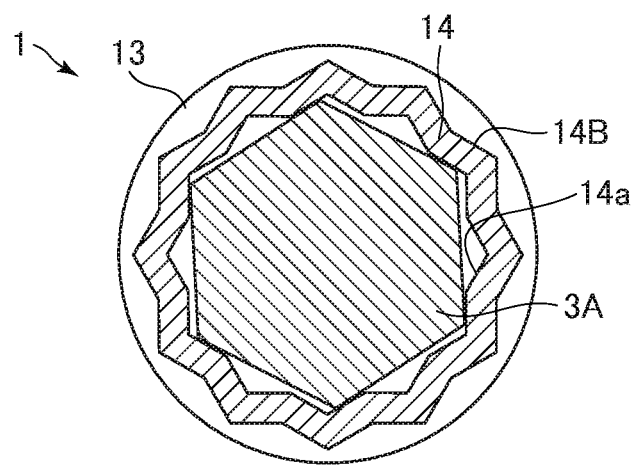
FIG. 32 is a view illustrating the leading end portion, in which an outer peripheral surface of the leading end portion has a dodecagonal shape, of the bolt according to the modification example 1-6.

For example, in the bolt 1 of the first embodiment, an outer peripheral surface 14B of the leading end portion 14 may have a dodecagonal shape and may serve as a torque transfer portion that receives a torque from a removal tool when the bolt 1 is removed as illustrated in FIG. 32. As a result, the shape of the head 12 can be simplified.

Figure 33:
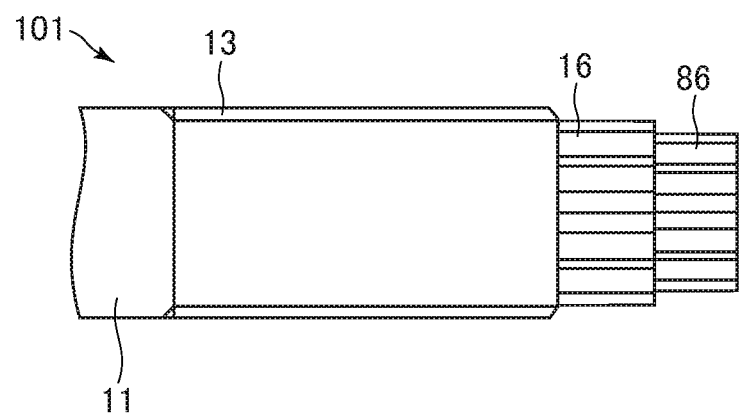
FIG. 33 is a view illustrating the pintail provided with an additional pintail of the bolt according to the third embodiment.

An additional pintail 86 serving as a torque transfer portion that receives a torque from the removal tool when the bolt 101 is removed may be provided on the leading end of the pintail 16 of the bolt 101 of the third embodiment as illustrated in FIG. 33. As a result, the shape of the head 12 can be simplified. When the bolt 101 is fastened, the pintail 86 may be used as a torque transfer portion when the bolt 101 is removed and the pintail 16 may be used as a torque transfer portion that receives a torque from the removal tool.

What is claimed is:

1. A bolt, comprising:
   a head; and
   a shank connected to the head and having a screw portion and a leading end portion, wherein
   the leading end portion of the shank includes a wall portion that defines a hole;
   the wall portion includes:
      a deformation portion configured to be plastically deformed by a torque from a fastening tool to be inserted in the hole; and
      a space forming portion configured to form a space between the space forming portion and the fastening tool; and
   the bolt is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range,
   wherein
   a plurality of deformation portions are provided; and
   the plurality of deformation portions are helically provided along an axial direction of the shank.

2. The bolt according to claim 1, wherein the screw portion is formed on an outer periphery of the leading end portion and on the head side of the leading end portion in the shank.

3. A bolt, comprising:
   a head; and
   a shank connected to the head and having a screw portion and a leading end portion, wherein
   the leading end portion of the shank includes a wall portion that defines a hole;
   the wall portion includes:
      a deformation portion configured to be plastically deformed by a torque from a fastening tool to be inserted in the hole; and
      a space forming portion configured to form a space between the space forming portion and the fastening tool; and
   the bolt is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range,
   wherein the hole is tapered in a depth direction thereof.

4. The bolt according to claim 3, wherein the screw portion is formed on an outer periphery of the leading end portion and on the head side of the leading end portion in the shank.

5. A bolt, comprising:
   a head; and
   a shank connected to the head and having a screw portion and a leading end portion, wherein
   the leading end portion of the shank includes a wall portion that defines a hole;
   the wall portion includes:
      a deformation portion configured to be plastically deformed by a torque from a fastening tool to be inserted in the hole; and
      a space forming portion configured to form a space between the space forming portion and the fastening tool; and
   the bolt is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range,
   wherein the leading end portion is provided on an end portion of the screw portion and a length of the leading end portion in a direction orthogonal to an axis of the shank is shorter than a diameter of the screw portion.

6. The bolt according to claim 5, further comprising a torque transfer portion provided on an outer periphery of the leading end portion and configured to receive a torque from a removal tool at the time of removal.

7. A bolt, comprising:
   a head;
   a shank connected to the head and having a screw portion; and
   a pintail provided on a leading end side of the shank and having an outer peripheral portion, wherein
   the outer peripheral portion includes:
      a deformation portion configured to be plastically deformed by a torque from a fastening tool; and
      a space forming portion configured to form a space between the space forming portion and the fastening tool; and
   the bolt is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range,
   wherein
   a plurality of deformation portions are provided; and
   the plurality of deformation portions are helically provided along an axial direction of the shank.

8. A bolt, comprising:
   a head;
   a shank connected to the head and having a screw portion; and
   a pintail provided on a leading end side of the shank and having an outer peripheral portion, wherein
   the outer peripheral portion includes:
      a deformation portion configured to be plastically deformed by a torque from a fastening tool; and
      a space forming portion configured to form a space between the space forming portion and the fastening tool; and the bolt is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range, wherein the pintail is tapered toward a leading end thereof.

9. A bolt, comprising:

a head;

a shank connected to the head and having a screw portion; and a pintail provided on a leading end side of the shank and having an outer peripheral portion, wherein the outer peripheral portion includes:
- a deformation portion configured to be plastically deformed by a torque from a fastening tool; and
- a space forming portion configured to form a space between the space forming portion and the fastening tool; and the bolt is configured such that a maximum torque applied to the deformation portion in a process, in which a part of the deformation portion is plastically deformed by the torque from the fastening tool and is accommodated in the space and the fastening tool is placed in an idle rotation state, is configured to be set to be within a predetermined range, wherein an additional pintail configured to receive a torque from a removal tool at the time of removal is provided on a leading end of the pintail or between the pintail and the leading end of the shank, the additional pintail having a diameter different from that of the pintail.

10. A bolt, comprising:

a head;

a shank connected to the head and having a screw portion; and a pintail provided on a leading end of the shank and having an outer peripheral surface, wherein the outer peripheral surface is provided with a plurality of protrusion portions; and the bolt is configured such that a maximum torque applied to the plurality of protrusion portions in a process, in which the plurality of protrusion portions receive a torque from a fastening tool and break from the outer peripheral surface and the fastening tool is placed in an idle rotation state, is configured to be set to be within a predetermined range, wherein the plurality of protrusion portions are helically provided along an axial direction of the shank.

\* \* \* \* \*